(12) United States Patent
Sunaga

(10) Patent No.: US 8,439,580 B2
(45) Date of Patent: May 14, 2013

(54) VIBRATING DEVICE AND IMAGE EQUIPMENT HAVING THE SAME

(75) Inventor: Masaaki Sunaga, Ome (JP)

(73) Assignee: Olympus Imaging Corp., Tokyo (JP)

( * ) Notice: Subject to any disclaimer, the term of this patent is extended or adjusted under 35 U.S.C. 154(b) by 59 days.

(21) Appl. No.: 13/249,655

(22) Filed: Sep. 30, 2011

(65) Prior Publication Data

US 2012/0099198 A1   Apr. 26, 2012

(30) Foreign Application Priority Data

Oct. 20, 2010   (JP) ................................ 2010-235360

(51) Int. Cl.
*G03B 17/00*   (2006.01)
*G02B 13/16*   (2006.01)

(52) U.S. Cl.
USPC .......................................... 396/439; 348/335

(58) Field of Classification Search .................. 396/439; 348/335
See application file for complete search history.

(56) References Cited

U.S. PATENT DOCUMENTS

| | | | | |
|---|---|---|---|---|
| 8,085,336 B2 * | 12/2011 | Urakami et al. | ............... | 348/340 |
| 8,199,200 B2 * | 6/2012 | Kawai et al. | ................. | 348/205 |
| 8,299,418 B2 * | 10/2012 | Shirono | ......................... | 250/234 |
| 2003/0202114 A1 * | 10/2003 | Takizawa et al. | ............. | 348/335 |
| 2005/0174467 A1 * | 8/2005 | Kawai | ............................. | 348/335 |
| 2007/0103579 A1 * | 5/2007 | Niwamae et al. | ............. | 348/335 |
| 2007/0103580 A1 * | 5/2007 | Noto | ............................... | 348/335 |
| 2008/0018775 A1 | 1/2008 | Inukai | | |
| 2011/0261245 A1 * | 10/2011 | Kawai et al. | .................. | 348/335 |
| 2011/0261246 A1 * | 10/2011 | Kawai et al. | .................. | 348/335 |

FOREIGN PATENT DOCUMENTS

JP   2008-28674 A   2/2008

* cited by examiner

*Primary Examiner* — Rodney Fuller
(74) *Attorney, Agent, or Firm* — Holtz, Holtz, Goodman & Chick, P.C.

(57) ABSTRACT

A dust-screening member arranged in front of an image forming unit that holds an image forming element configured to generate an optical image, is formed into a box shape that includes a plate-shaped polygonal light transmitting part that passes light entering from or to the image forming element, and a plurality of foot portions that tilt by a predetermined angle and extend from all sides of the light transmitting part or portions near all sides in a direction in which the image forming unit is located. The light transmitting part and the plurality of foot portions are formed using the same material. A vibrating member is fixed to at least one of the plurality of foot portions. The dust-screening member is held by an elastic force of an elastic member arranged between the plurality of foot portions and a support member configured to support the plurality of foot portions.

18 Claims, 11 Drawing Sheets

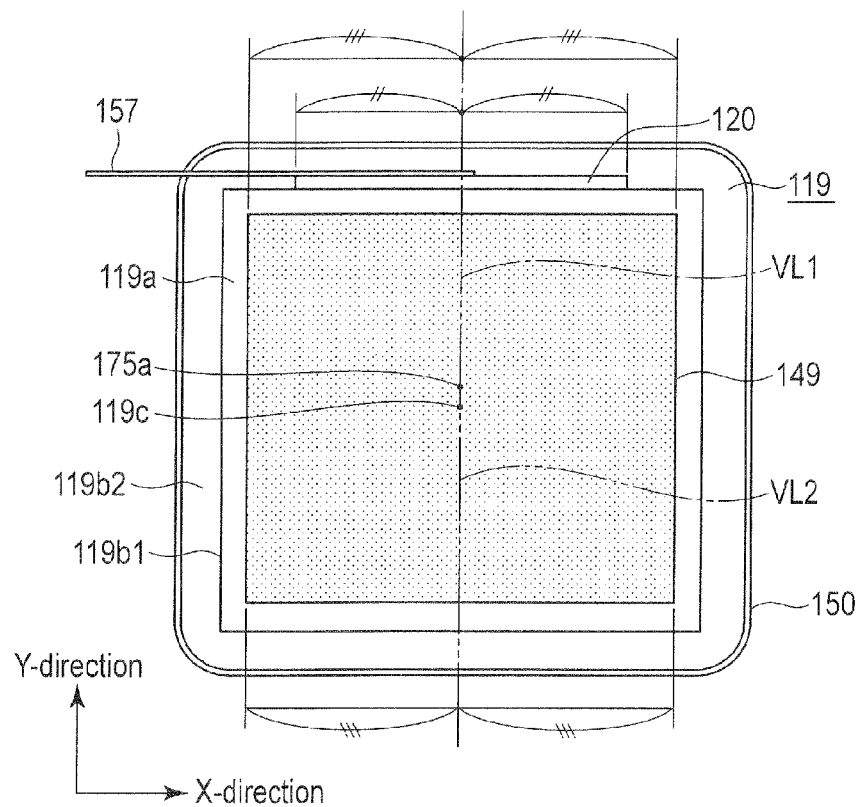
F I G. 4 A
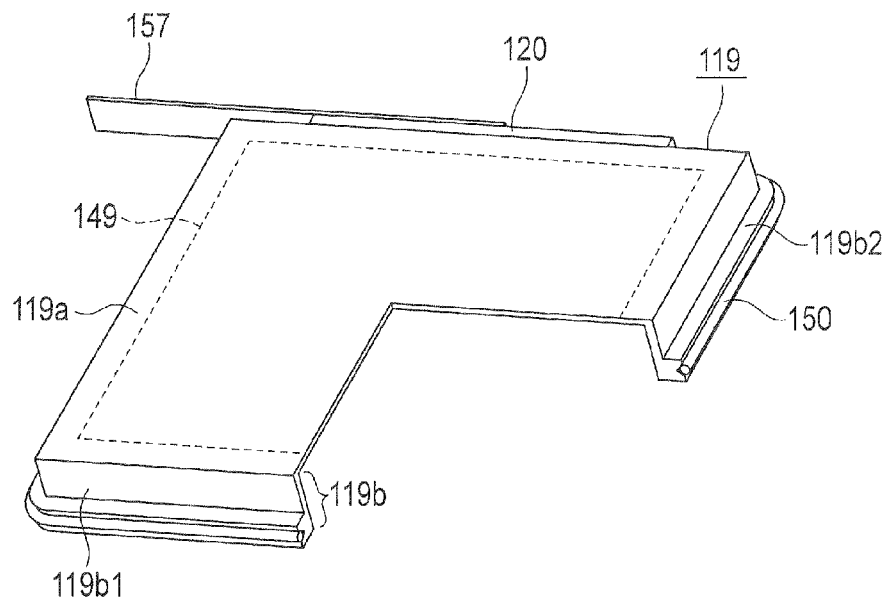
F I G. 4 B

VIBRATING DEVICE AND IMAGE EQUIPMENT HAVING THE SAME

CROSS-REFERENCE TO RELATED APPLICATIONS

This application is based upon and claims the benefit of priority from prior Japanese Patent Application No. 2010-235360, filed Oct. 20, 2010, the entire contents of which are incorporated herein by reference.

BACKGROUND OF THE INVENTION

1. Field of the Invention

The present invention relates to image equipment having image forming elements such as an image sensor element or a display element, and also to a vibrating device designed to vibrate the dust-screening member that is arranged at the front of each image forming element of such an image equipment.

2. Description of the Related Art

As image equipment having image forming elements, there is known an image acquisition apparatus that has an image sensor element configured to produce a video signal corresponding to the light applied to its photoelectric conversion surface. Also known is an image projector that has a display element, such as liquid crystal element, which displays an image on a screen. In recent years, image equipment having such image forming elements have been remarkably improved in terms of image quality. If dust adheres to the surface of the image forming element such as the image sensor element or display element or to the surface of the transparent member (optical element) that is positioned in front of the image forming element, the image produced will have shadows of the dust particles. This makes a great problem.

For example, digital cameras of called "lens-exchangeable type" have been put to practical use, each comprising a camera body and a photographic optical system removably attached to the camera body. The lens-exchangeable digital camera is so designed that the user can use various kinds of photographic optical systems, by removing the photographic optical system from the camera body and then attaching any other desirable photographic optical system to the camera body. When the photographic optical system is removed from the camera body, the dust floating in the environment of the camera flows into the camera body, possibly adhering to the surface of the image sensor element or to the surface of the transparent member (optical element), such as a lens, cover glass or the like, that is positioned in front of the image sensor element. The camera body contains various mechanisms, such as a shutter and a diaphragm mechanism. As these mechanisms operate, they produce dust, which may adhere to the surface of the image sensor element as well.

Projectors have been put to practical use, too, each configured to enlarge an image displayed by a display element (e.g., CRT or liquid crystal element) and project the image onto a screen so that the enlarged image may be viewed. In such a projector, too, dust may adhere to the surface of the display element or to the surface of the transparent member (optical element), such as a lens, cover glass or the like, that is positioned in front of the display element, and enlarged shadows of the dust particles may inevitably be projected to the screen.

Various types of mechanisms that remove dust from the surface of the image forming element or the transparent member (optical element) that is positioned in front of the image sensor element, provided in such image equipment have been developed.

For example, US 2008/0018775 A1 discloses an image pickup unit 400 including an optical lowpass filter 410, a piezoelectric element 430, and an image pickup element 33, and the like as units. The optical lowpass filter 410 is separated into a plurality of optical members in the photographic optical axis direction. That is, the optical lowpass filter 410 includes a first grouped optical member 411, a second grouped optical member 412, and a third grouped optical member 413. The first grouped optical member 411 is given vibration in the direction perpendicular to the photographic optical axis by the piezoelectric element 430 to remove foreign substances such as dust adhering to the surface of the optical member. In the image pickup unit 400, the first grouped optical member 411 is formed from a birefringent plate made of crystal having a single crystal structure. Such a birefringent plate can be vibrated more efficiently than, for example, glass that is an amorphous material because of a higher Q value representing the sharpness of resonance and the difficulty in attenuating vibration.

In the image pickup unit 400 disclosed in US 2008/0018775 A1, a vibration transfer member 431 having an almost L-shaped section is bonded and fixed to the upper side of the first grouped optical member 411 included in the optical lowpass filter 410. A biasing force transfer member 441 having an almost L-shaped section is bonded and fixed to the lower side of the first grouped optical member 411 on the opposite side. A container portion 421 configured to store the piezoelectric element 430 is formed on the upper side of a frame portion 420a of a lowpass filter holding member 420 that holds the optical lowpass filter 410. One end face of the piezoelectric element 430 is fixed to the frame portion 420a by bonding or the like. In this case, the piezoelectric element 430 is held such that expansion occurs in a direction (the vertical direction of the camera) perpendicular to the photographic optical axis upon voltage application. In addition, the first grouped optical member 411 is arranged between an image pickup element holding member 510 and an arm portion 460c of a regulation member 460. The first grouped optical member 411 is fixed by fixing the regulation member 460 to the image pickup element holding member 510 by a screw 550.

BRIEF SUMMARY OF THE INVENTION

According to a first aspect of the present invention, there is provided a vibrating device comprising:

a dust-screening member arranged in front of an image forming unit that holds an image forming element configured to generate an optical image, the dust-screening member being formed into a box shape that includes a plate-shaped polygonal light transmitting part that passes one of light entering from the image forming element and light entering to the image forming element, and a plurality of foot portions that tilt by a predetermined angle and extend from one of all sides of the light transmitting part and portions near all sides in a direction in which the image forming unit is located;

a support member configured to support the plurality of foot portions;

a vibrating member fixed to at least one of the plurality of foot portions and configured to apply a vibrational amplitude vertical to a surface of the light transmitting part to be vibrated;

an elastic member arranged to seal a space between the support member and the plurality of foot portions, wherein the light transmitting part and the plurality of foot portions are formed using the same material, and the dust-screening member is held by an elastic force of the elastic member arranged between the support member and the plurality of foot portions.

According to a second aspect of the present invention, there is provided an image equipment comprising:

an image forming unit configured to hold an image forming element configured to generate an optical image;

a dust-screening member arranged in front of the image forming unit, the dust-screening member being formed into a box shape that includes a plate-shaped polygonal light transmitting part that passes one of light entering from the image forming element and light entering to the image forming element, and a plurality of foot portions that tilt by a predetermined angle and extend from one of all sides of the light transmitting part and portions near all sides in a direction in which the image forming unit is located;

a support member configured to support the plurality of foot portions;

a vibrating member fixed to at least one of the plurality of foot portions and configured to apply a vibrational amplitude vertical to a surface of the light transmitting part to be vibrated;

an elastic member arranged to seal a space between the support member and the plurality of foot portions, wherein the light transmitting part and the plurality of foot portions are formed using the same material, and the dust-screening member is held by an elastic force of the elastic member arranged between the support member and the plurality of foot portions.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a front view of a dust filter viewed from the lens side;

FIG. 4B is a partially cutaway perspective view of the dust filter;

DETAILED DESCRIPTION OF THE INVENTION

Figure 1:
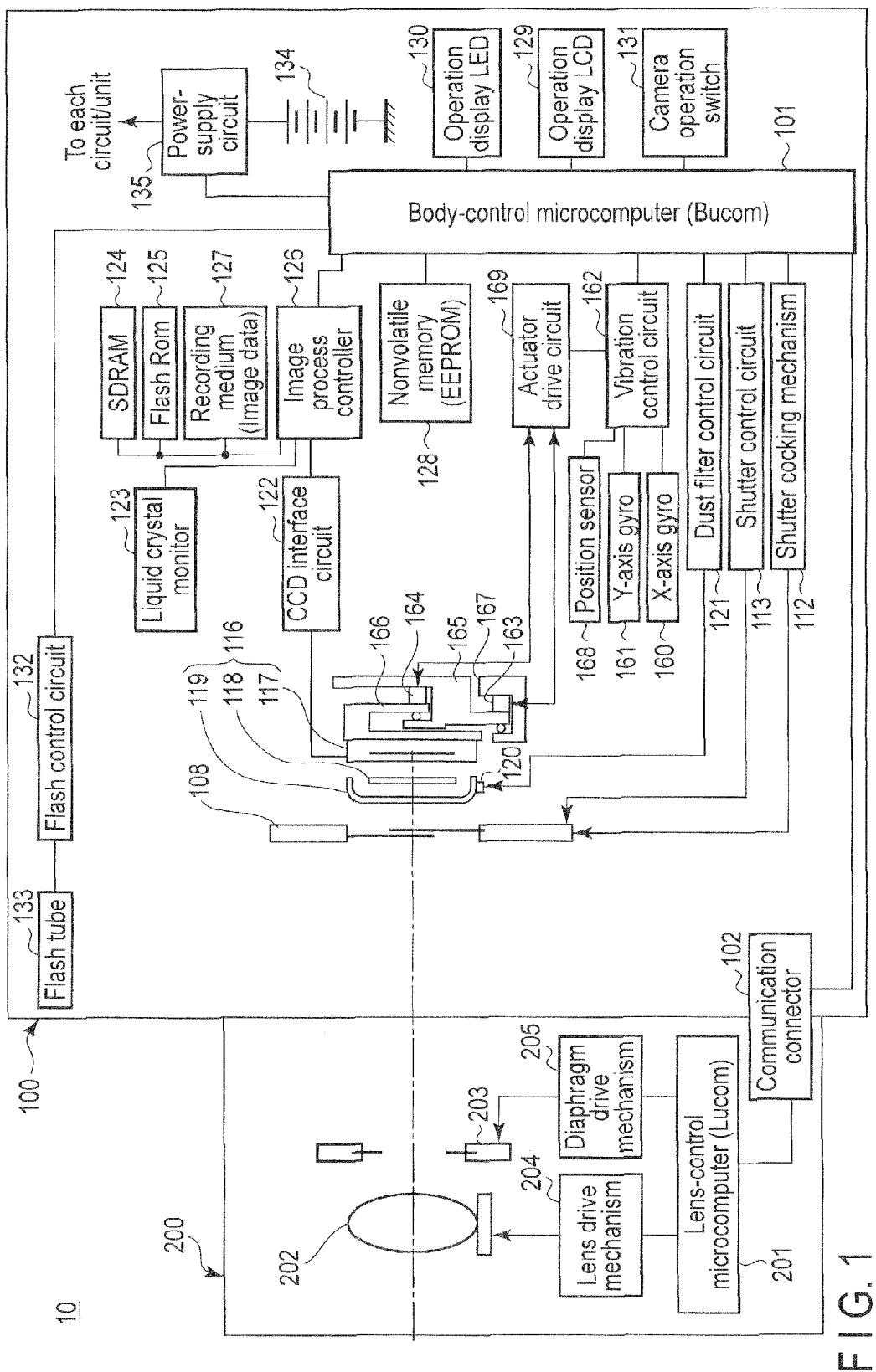
FIG. 1 is a block diagram schematically showing an exemplary system configuration, mainly electrical, of a lens-exchangeable, single-lens electronic camera (digital camera) that is a first embodiment of the image equipment according to this invention.

Best modes of practicing this invention will be described with reference to the accompanying drawings.

First Embodiment

An image equipment according to this invention, which will be exemplified below in detail, has a dust removal mechanism for the image acquisition unit that performs photoelectric conversion to produce an image signal. Here, a technique of improving the dust removal function of, for example, an electronic camera (hereinafter called "camera" will be explained. The first embodiment will be described, particularly in connection with a lens-exchangeable electronic camera (digital camera), with reference to FIGS. 1 to 3C.

First, the system configuration of a digital camera 10 according to this embodiment will be described with reference to FIG. 1. The digital camera 10 has a system configuration that comprises body unit 100 used as camera body, and a lens unit 200 used as an exchange lens, i.e., one of accessory devices.

The lens unit 200 can be attached to and detached from the body unit 100 via a lens mount (not shown) provided on the front of the body unit 100. The control of the lens unit 200 is performed by the lens-control microcomputer (hereinafter called "Lucom") 201 provided in the lens unit 200. The control of the body unit 100 is performed by the body-control microcomputer (hereinafter called "Bucom" 101 provided in the body unit 100. By a communication connector 102, the Lucom 210 and the Bucom 101 are electrically connected to each other, communicating with each other, while the lens unit 200 remains attached to the body unit 100. The Lucom 201 is configured to cooperate, as subordinate unit, with the Bucom 101.

The lens unit 200 further has a photographic lens 202, a diaphragm 203, a lens drive mechanism 204, and a diaphragm drive mechanism 205. The photographic lens 202 is driven by a stepping motor (not shown) that is provided in the lens drive mechanism 204. The diaphragm 203 is driven by a stepping motor (not shown) that is provided in the diaphragm drive mechanism 205. The Lucom 201 controls these motors in accordance with the instructions made by the Bucom 101.

In the body unit 100, a shutter 108, a shutter cocking mechanism 112, and a shutter control circuit 113 are arranged as shown in FIG. 1. The shutter 108 is a focal plane shutter arranged on the photographic optical axis. The shutter cocking mechanism 112 biases the spring (not shown) that drives the front curtain and rear curtain of the shutter 108. The shutter control circuit 113 controls the motions of the front curtain and rear curtain of the shutter 108.

In the body unit 100, an image acquisition unit 116 is further provided along a photographic optical axis to perform photoelectric conversion on the image of an object, which has passed through the above-mentioned optical system. The image acquisition unit 116 is constituted as a unit by integrating an image forming unit and a dust filter 119 which is a dust-screening member, via a holder 146. The image forming unit includes a CCD 117 that is an image sensor element as an image forming element, and an optical low-pass filter (LPF) 118 that is arranged in front of the CCD 117. Here, the optical low-pass filter (LPF) 118 is an optical element made of quartz crystal or the like. The dust filter 119 is an optical element made of quartz crystal, glass or the like, and may be made of a transparent plastic material. That is, the dust filter 119 may be a box-like transparent member which can be vibrated.

On one side of the circumferential edge of the dust filter 119, a piezoelectric element 120 is attached. The piezoelectric element 120 has two electrodes. A dust filter control circuit 121, which is a drive unit, drives the piezoelectric element 120 at the frequency determined by the size and material of the dust filter 119. As the piezoelectric element 120 vibrates, the dust filter 119 undergoes specific vibration. Dust can thereby be removed from the surface of the dust filter 119. To the image acquisition unit 116, an anti-vibration unit is attached to compensate for the motion of the hand holding the digital camera 10.

The digital camera 10 according to this embodiment further has a CCD interface circuit 122, a liquid crystal monitor 123, an SDRAM 124, a Flash ROM 125, and an image process controller 126, thereby to perform not only an electronic image acquisition function, but also an electronic record/display function. The electronic image acquisition function includes a so-called through image display function, which displays an image acquired by the CCD 117 as a moving image on the liquid crystal monitor 123, and uses it as a viewfinder, and a moving image recording function which records a moving image. As a viewfinder function, an optical single-lens reflex viewfinder or the like may be provided. The CCD interface circuit 122 is connected to the CCD 117. The SCRAM 124 and the Flash ROM 125 function as storage areas. The image process controller 126 uses the SCRAM 124 and the Flash ROM 125, to process image data. A recording medium 127 is removably connected by a communication connector (not shown) to the body unit 100 and can therefore communicate with the body unit 100. The recording medium 127 is an external recording medium, such as one of various memory cards or an external HDD, and records the image data acquired by photography. As another storage area, a nonvolatile memory 128, e.g., EEPROM, is provided and can be accessed from the Bucom 101. The nonvolatile memory 128 stores prescribed control parameters that are necessary for the camera control.

To the Bucom 101, there are connected an operation display LCD 129, an operation display LED 130, a camera operation switch 131, and a flash control circuit 132. The operation display LCD 129 and the operation display LED 130 display the operation state of the digital camera 10, informing the user of this operation state. The operation display LED 129 or the operation display LED 130 has, for example, a display unit configured to display the vibration state of the dust filter 119 as long as the dust filter control circuit 121 keeps operating. The camera operation switch 131 is a group of switches including, for example, a release switch, mode changing switch, a power switch, which are necessary for the user to operate the digital camera 10. The flash control circuit 132 drives a flash tube 133.

In the body unit 100, a battery 134 used as power supply and a power-supply circuit 135 are further provided. The power-supply circuit 135 converts the voltage of the battery 134 to a voltage required in each circuit unit of the digital camera 10 and supplies the converted voltage to the each circuit unit. In the body unit 100, too, a voltage detecting circuit (not shown) is provided, which detects a voltage change at the time when a current is supplied from an external power supply though a jack (not shown).

The components of the digital camera 10 configured as described above operate as will be explained below. The image process controller 126 controls the CCD interface circuit 122 in accordance with the instructions coming from the Bucom 101, whereby image data is acquired from the CCD 117. The image data is converted to a video signal by the image process controller 126. The image represented by the video signal is displayed by the liquid crystal monitor 123. Viewing the image displayed on the liquid crystal monitor 123, the user can confirm the image photographed.

The SDRAM 124 is a memory for temporarily store the image data and is used as a work area in the process of converting the image data. The image data is held in the recording medium 127, for example, after it has been converted to JPEG data. Here, when image data is for a moving image, it is converted into MPEG data.

The photographic lens 202 is focused as follows. Images are acquired by sequentially changing the position of the photographic lens 202. Among the acquired images, a position with the highest contrast is calculated by the Bucom 101. This position is transmitted from the Bucom 101 to the Lucom 201 through the communication connector 102. The Lucom 201 controls the photographic lens 202 to this position. As for photometric measurement, know measurement is performed based on the amount of light detected from an acquired image.

The image acquisition unit 116 that includes the CCD 117 will be described with reference to FIGS. 2 to 3C. Note that hatching representing sections is omitted in FIG. 3B but illustrated only in FIG. 3C showing an enlarged view of the main part.

As described above, the image acquisition unit 116 has the CCD 117, the optical LPF 118, the dust filter 119, and the piezoelectric element 120. The CCD 117 is an image sensor element that produces an image signal that corresponds to the light applied to its photoelectric conversion surface through the photographic optical system. The optical LPF 118 is arranged at the photoelectric conversion surface of the CCD 117 and removes high-frequency components from the light beam coming from the object through the photographic optical system. The dust filter 119 is a box-like dust-screening member arranged in front of the optical LPF 118 and facing the optical LPF 118, spaced apart therefrom by a predetermined distance. The piezoelectric element 120 is arranged on a side wall portion of the box-like dust filter 119 and is a vibrating member for applying specific vibration to the dust filter 119.

The CCD chip 136 of the CCD 117 is mounted directly on a flexible substrate 137 that is arranged on a fixed plate 138. From the ends of the flexible substrate 137, connection parts 139a and 139b extend. Connectors 140a and 140b are provided on a main circuit board 141. The connection parts 139a and 139b are connected to the connectors 140a and 140b, whereby the flexible substrate 137 is connected to the main circuit board 141. The CCD 117 has a protection glass plate 142. The protection glass plate 142 is secured to the flexible substrate 137, with a spacer 143 interposed between it and the flexible substrate 137.

Between the CCD 117 and the optical LPF 118, a filter holding member 144 made of elastic material is arranged on the front circumferential edge of the CCD 117, at a position where it does not cover the effective area of the photoelectric conversion surface of the CCD 117. The filter holding member 144 abuts on the optical LPF 118, at a part close to the rear circumferential edge of the optical LPF 118. The optical LPF 118 is supported by the filter holding member 144 while being pressed by a press member 145 from the front side. The holder 146 is provided, covering seals the CCD 117 and the optical LPF 118 in airtight fashion. The holder 146 has a rectangular opening 147 in a part that is substantially central around the photographic optical axis. A projecting portion 148 is formed on the internal circumferential portion of the holder 146 on the side of the dust filter 119 in the opening 147. The circumferential edge of the filter holding member 144 is sandwiched between the projecting portion 148 and the protection glass plate 142 provided in the CCD 117. This allows to maintain the substantial airtightness between the CCD 117 and the optical LPF 118 and also prevent the optical LPF 118 from being disconnected from the inside of the holder 146 to the front side. The level of airtight sealing between the CCD 117 and the optical LPF 118 is sufficient to prevent dust from entering to form an image having shadows of dust particles. In other words, the sealing level need not be so high as to completely prevent the in-flow of gasses.

On the other hand, the dust filter 119 has a thin-walled box shape with a bottom surface portion 119a formed into a polygonal plate-like shape as a whole (a square plate in the example shown in FIGS. 2, 3A, 38, and 3C). Out of the bottom surface portion 119a, at least an area spreading as prescribed radially from the position where a maximum vibrational amplitude can be obtained forms an image forming light passing area 149 that is a polygonal light transmitting part. Moreover, the dust filter 119 has foot portions 119b which tilt by a predetermined angle and extend from all sides of the image forming light passing area 149 or portions near all sides, that is, all end face portions of the bottom surface portion 119a in the direction of the CCD 117. The bottom surface portion 119a and the foot portions 119b are formed using the same material.

The holder 146 supports the foot portions 119b of the box-shaped dust filter 119 by fitting them in the opening 147. A frame-shaped sealing member 150 formed from an elastic member such as a rubber member is fitted on the foot portions 119h. A groove portion 151 is formed for the entire circumference in the internal edge portion of the holder 146 on the side of the opening 147, in which the frame-shaped sealing member 150 fitted on the foot portions 119b of the dust filter 119 is fitted so as to be held and fixed. The groove portion 151 also has an aligning function of holding, on the front of the optical LPF 118 at a predetermined interval, the dust filter 119 with the frame-shaped sealing member 150 fitted thereon. After the dust filter 119 is fitted at a predetermined position of the holder 146, a holding member 152 is attached to support the foot portions 119b of the dust filter 119. The foot portions 119b of the dust filter 119 are thus supported by the support member including the holder 146 and the holding member 152, thereby holding and fixing the dust filter 119. Note that the holder 146 includes a lock portion 153, and the holding member 152 includes an engaging portion 154. The holding member 152 is attached by causing the lock portion 153 of the holder 146 to lock the engaging portion 154 of the holding member 152. The frame-shaped sealing member 150 is made of a vibration attenuating material such as a rubber or a resin. Hence, the frame-shaped sealing member 150 holds the dust filter 119 by its elastic force without impeding the vibration of the dust filter 119. Moreover, a space formed by the dust filter 119 and the LPF 118 is sealed from dust by the frame-shaped sealing member 150. Hence, such dust that forms an image having shadows of dust particles does not enter this space from the outside.

Note that each of the foot portions 119b of the dust filter 119 includes a sidewall portion 119b1 on which the piezoelectric element 120 serving as the vibrating member can be arranged, and a projecting portion 119b2 formed at one end of the sidewall portion 119b1 not to be in contact with the piezoelectric element 120. The section of the sidewall portion 119b1 and the projecting portion 119b2 has an almost L shape. Especially in the example shown in FIGS. 2, 3A, 3B, and 3C, the image forming light passing area 149 serving as the light transmitting part and the bottom surface portion 119a are rectangular. The sidewall portions 119b1 almost vertically extend from the image forming light passing area 149 and the bottom surface portion 119a. The projecting portions 119b2 extend from the sidewall portions 119b1 to be almost parallel to the image forming light passing area 149 and the bottom surface portion 119a.

The frame-shaped sealing member 150 is arranged at a position to seal a space between the projecting portions 119b2 and the support member formed from the holder 146 and the holding member 152. The projecting portions 119b2 engage with the support member. The frame-shaped sealing member 150 is arranged at a position to generate a biasing force to maintain the engaging state between the projecting portions 119b2 and the support member. More specifically, the frame-shaped sealing member 150 is arranged in the groove portion 151 formed by the projecting portions 119b2 and the support member.

Additionally, the piezoelectric element 120 serving as the vibrating member is rectangular and is arranged so as to be stored inside the sidewall portions 119b1. To the end of the piezoelectric element 120, which is vibrating member, flex 157, i.e., flexible printed board, is electrically connected. The flex 157 inputs an electric signal (later described) from the dust filter control circuit 121 to the piezoelectric element 120, causing the element 120 to vibrate in a specific way. The flex 157 is made of resin and cupper etc., and has flexibility. Therefore, the flex 157 little attenuates the vibration of the piezoelectric element 120. The flex 157 is provided at position where the vibrational amplitude is small (at the nodes of vibration, which will be described later), and can therefore suppress the attenuation of vibration. The piezoelectric element 120 moves relative to the body unit 100 if the camera 10 has such a hand-motion compensating mechanism as will be later described. Hence, if the dust filter control circuit 121 is held by a holding member formed integral with the body unit 100, the flex 157 is deformed and displaced as the hand-motion compensating mechanism operates. In this case, the flex 157 effectively works because it is thin and flexible. In the present embodiment, the flex 157 has a simple configuration, extending from one position. It is best fit for use in cameras having a hand-motion compensating mechanism.

The dust removed from the surface of the dust filter 119 falls onto the bottom of the body unit 100, by virtue of the vibration inertia and the gravity. Accordingly, it is preferable to arrange a holding member made of, for example, adhesive tape, at right below the dust filter 119. The holding member can reliably trap the dust fallen from the dust filter 119, preventing the dust from moving back to the surface of the dust filter 119.

The hand-motion compensating mechanism will be explained in brief. As shown in FIG. 1, the hand-motion compensating mechanism is composed of an X-axis gyro 160, a Y-axis gyro 161, a vibration control circuit 162, an X-axis actuator 163, a Y-axis actuator 164, an X-frame 165, a Y-frame 166 (holder 146), a frame 167, a position sensor 168, and an actuator drive circuit 169. The X-axis gyro 160 detects the angular velocity of the camera when the camera moves, rotating around the X axis. The Y-axis gyro 161 detects the angular velocity of the camera when the camera rotates around the Y axis. The vibration control circuit 162 calculates a value by which to compensate the hand motion, from the angular-velocity signals output from the X-axis gyro 160 and Y-axis gyro 161. In accordance with the hand-motion compensating value thus calculated, the actuator drive circuit 169 moves the CCD 117 in the X-axis direction and Y-axis direction, which are first and second directions orthogonal to each other in the XY plane that is perpendicular to the photographic optical axis, thereby to compensate the hand motion, if the photographic optical axis is taken as Z axis. More precisely, the X-axis actuator 163 drives the X-frame 165 in the X-axis direction upon receiving a drive signal from the actuator drive circuit 169, and the Y-axis actuator 164 drives the Y-frame 166 in the Y-axis direction upon receiving a drive signal from the actuator drive circuit 169. That is, the X-axis actuator 163 and the Y-axis actuator 164 are used as drive sources, the X-frame 165 and the Y-frame 166 (holder 146) which holds the CCD 117 of the image acquisition unit 116 are used as objects that are moved with respect to the frame 167. Note that the X-axis actuator 163 and the Y-axis actuator 164 are each composed of an electromagnetic motor, a feed screw mechanism, and the like. Alternatively, each actuator may be a linear motor using a voice coil motor, a linear piezoelectric motor or the like. The position sensor 168 detects the position of the X-frame 165 and the position of the Y-frame 166. On the basis of the positions the position sensor 168 have detected, the vibration control circuit 162 controls the actuator drive circuit 169, which drives the X-axis actuator 163 and the Y-axis actuator 164. The position of the CCD 117 is thereby controlled.

The dust removal mechanism of the first embodiment will be described in detail, with reference to FIGS. 4A to 10. The dust filter 119 has a thin box shape. A bottom surface portion 119a of the box has a polygonal plate-like shape as a whole (a square plate, in this embodiment). Alternatively, the bottom surface portion 119a has a shape surrounded by a curve including a circle. Moreover, the bottom surface portion 119a of the dust filter 119 has a circular shape as a whole, and may be 2-shaped, formed by linearly cutting part of a circular plate, thus defining one side. Still alternatively, it may be formed in an oval shape by cutting a square plate, having two opposite sides accurately cut and having upper and lower sides. In this manner, the shape may be a combination of curves and straight lines. Moreover, the dust filter 119 has foot portions 119b which tilt as much as a predetermined angle and extend from all end face portions of the bottom surface portion 119a in a direction of the image forming element. The bottom surface portion 119a and the foot portions 119b form the box-like dust filter 119 in the box shape in which the bottom surface portion 119a and side wall portions 119b1 of the foot portions 119b have a substantially uniform thickness. The above-mentioned fastening mechanism fastens the dust filter 119, with the light transmitting part (an image forming light passing area 149) opposed to the front of the LPF 118 and spaced from the LPF 118 by a predetermined distance. Here, both the bottom surface portion 119a and the side wall portions 119b1 of the box-like dust filter 119 may have a uniformly small thickness, or at least the bottom surface portion 119a may have the uniformly small thickness.

Moreover, in a flat surface portion of the side wall portion 119b1, the piezoelectric element 120 is disposed by means of, for example, adhesion using the adhesive, or the like. The piezoelectric element 120 is the vibrating member for applying the vibration to the bottom surface portion 119a of the dust filter 119. In consequence, a vibrator 170 is formed by arranging the piezoelectric element 120 on the dust filter 119. The vibrator 170 undergoes resonance when a voltage of a prescribed frequency is applied to the piezoelectric element 120. The resonance achieves such bending vibration of a large amplitude vertically to the bottom surface portion 119a, as illustrated in FIG. 5A to FIG. 5C.

Here, an angle formed by the each foot portions 119b (each side wall portion 119b1) and the bottom surface portion 119a constituting the dust filter 119 is preferably 90° or more, when the integral forming of the foot portion 119b and the bottom surface portion 119a is taken into consideration. Moreover, when the enlargement of a projected area and the rigidity are taken into consideration, the angle is preferably set to be about 135° or less. Furthermore, when a surface connecting the bottom surface portion 119a to the side wall portion 119b1 is constituted of a surface which is approximate to a cylindrical surface, the rigidity of the dust filter 119 becomes higher, and the dust filter 119 can be miniaturized. Furthermore, in the present embodiment, the bottom surface portion 119a and the foot portions 119b of the dust filter 119 are integrally formed, but the portions may be constituted of separate members joined to each other. On the other hand, only one piezoelectric element 120 is disposed in FIG. 4A and FIG. 4B, but a plurality of piezoelectric elements may be arranged. Moreover, the piezoelectric element 120 may be disposed on an inner surface of the dust filter 119 (the surface on an image acquisition element side).

Although not particularly illustrated, the piezoelectric element 120 has a first signal electrode, and a second signal electrode provided on the back surface opposing the first signal electrode and bent toward that surface of the piezoelectric element 120, on which the first signal electrode is provided, along the side wall portion of the piezoelectric element 120. The flex 157 having the above-mentioned conductive pattern is electrically connected to the first and second signal electrodes. To the first and second signal electrodes, a drive voltage of the prescribed frequency is applied form the dust filter control circuit 121 through flex 157. The drive voltage, thus applied, can cause the dust filter 119 to undergo such a two-dimensional, standing-wave bending vibration as is shown in FIGS. 5A to 5C. The side wall portion 119b of the dust filter 119 has a long side length LA, and a short side length LB orthogonal to the long side. (This size notation accords with the size notation used in FIGS. 8 and 9.) Since the dust filter 119 shown in FIG. 5A is rectangular, it is identical in shape to the "virtual rectangle" according to this invention (described later). (The long side length LA is equal to the side length LF of the virtual rectangle). The bending vibration shown in FIG. 5A is standing wave vibration. In FIG. 5A, the blacker the streaks, each indicating a node area 173 of vibration (i.e., area where the vibrational amplitude is small), the smaller the vibrational amplitude is. Note that, the meshes shown in FIG. 5A are division meshes usually used in the final element method.

Figures 5A, 5B:
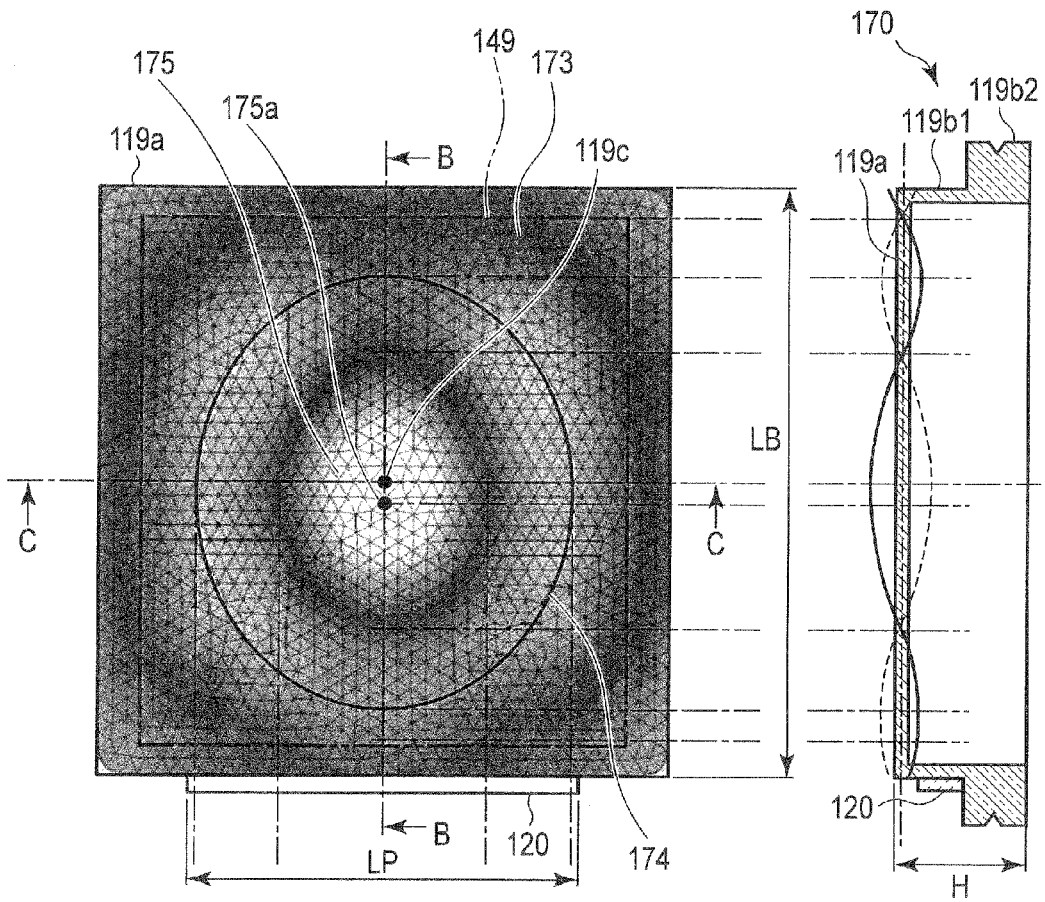
FIG. 5A is a front view of a dust filter, explaining how the dust filter is vibrated.
FIG. 5B is a sectional view of the dust filter, taken along line B-B shown in FIG. 5A.
Figure 5C:
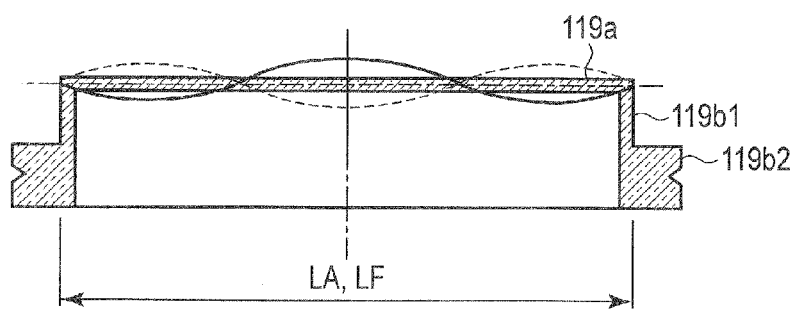
FIG. 5C is a sectional view of the dust filter, taken along line C-C shown in FIG. 5A.

If the node areas 173 are at short intervals as shown in FIG. 5A when the vibration speed is high, in-plane vibration (vibration along the surface) will occur in the node areas 173. This vibration induces a large inertial force in the direction of the in-plane vibration (see mass point Y2 in FIG. 10, described later, which moves over the node along an arc around the node, between positions Y2 and Y2') to the dust at the node areas 173. If the dust filter 119 is inclined to become parallel to the gravity so that a force may act along the dust receiving surface, the inertial force and the gravity can remove the dust from the node areas 173.

In FIG. 5A, the white areas indicate areas where the vibrational amplitude is large. The dust adhering to any white area is removed by the inertial force exerted by the vibration. The dust adhering to a node area 173 of the vibration can be removed, when an electric signal having a different frequency is input into the piezoelectric element 120 to produce vibration in another vibration mode with another vibrational amplitude in the node area 173 (e.g. a vibrational mode shown in FIG. 6).

Figure 7:
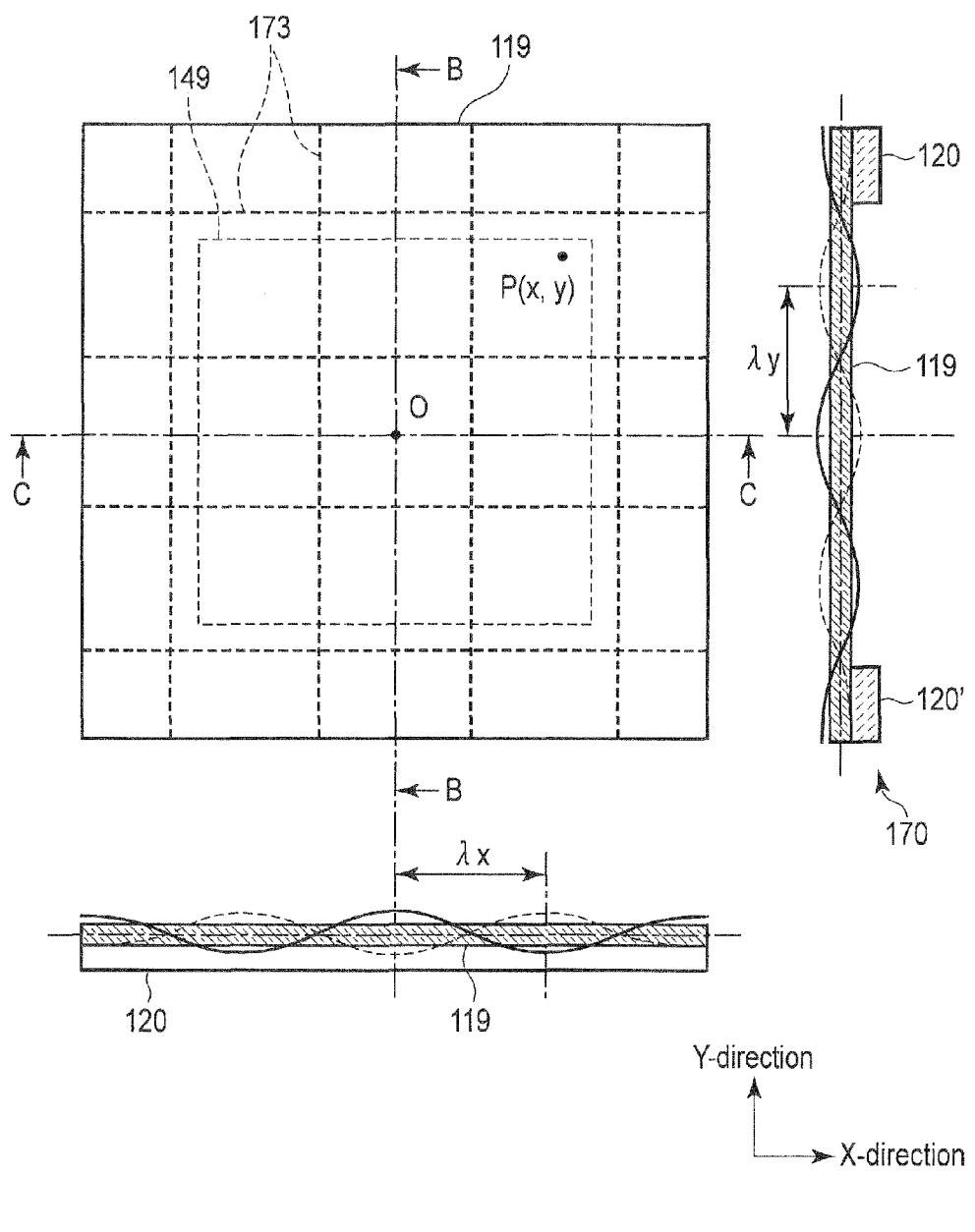
FIG. 7 is a diagram explaining the concept of vibrating the dust filter.

The bending vibrational mode shown in FIG. 5A is achieved by synthesizing the bending vibration of the X-direction and the bending vibration of the Y-direction. The fundamental state of this synthesis is shown in FIG. 7. By placing the vibrator 170, which has two piezoelectric elements 120 and 120' arranged symmetric to the central axis X of the dust filter 119, on a member that little attenuates vibration, such as foamed rubber block, and then made to vibrate freely, a vibrational mode of producing such lattice-shaped node areas 173 as shown in FIG. 7 will be usually attained easily. In the front view of FIG. 7, the broken lines define the node areas 173 (more precisely, the lines indicate the positions where the vibrational amplitude is minimal in the widthwise direction of lines). In this case, a standing wave, bending vibration at wavelength $\lambda_x$ occurs in the X-direction, and a standing wave, bending vibration at wavelength $\lambda_y$ occurs in the Y-direction. These standing waves are synthesized. With respect to the origin (x=0, y=0), the vibration Z (x, y) at a given point P (x, y) is expressed by Equation 1, as follows:

$$Z(x,y) = A \cdot W_{mn}(x,y) \cdot \cos(\gamma) + A \cdot W_{nm}(x,y) \cdot \sin(\gamma) \quad (1)$$

where A is amplitude (a fixed value here, but actually changing with the vibrational mode or the power supplied to the piezoelectric elements); m and n are positive integers including 0, indicating the order of natural vibration corresponding to the vibrational mode; $\gamma$ is a given phase angle;

$$W_{mn}(x, y) = \sin\left(n\pi \cdot x + \frac{\pi}{2}\right) \cdot \sin\left(m\pi \cdot y + \frac{\pi}{2}\right); \text{ and}$$

$$W_{nm}(x, y) = \sin\left(m\pi \cdot x + \frac{\pi}{2}\right) \cdot \sin\left(n\pi \cdot y + \frac{\pi}{2}\right).$$

Assume that the phase angle $\gamma$ is 0 ($\gamma$=0). Then, Equation 1 changes to:

$$Z(x, y) = A \cdot W_{mn}(x, y)$$

$$= A \cdot \sin\left(\frac{n \cdot \pi \cdot x}{\lambda_x} + \frac{\pi}{2}\right) \cdot \sin\left(\frac{m \cdot \pi \cdot y}{\lambda_y} + \frac{\pi}{2}\right).$$

Further assume that $\lambda_x = \lambda_y = \lambda = 1$ (x and y are represented by the unit of the wavelength of bending vibration). Then:

$$Z(x, y) = A \cdot W_{mn}(x, y)$$

$$= A \cdot \sin\left(n \cdot \pi \cdot x + \frac{\pi}{2}\right) \cdot \sin\left(m \cdot \pi \cdot y + \frac{\pi}{2}\right).$$

FIG. 7 shows the vibrational mode that is applied if m=n (since the X-direction vibration and the Y-direction vibration are identical in terms of order and wavelength, the dust filter 119 has a square shape). In this vibrational mode, the peaks, nodes and valleys of vibration appear at regular intervals in both the X-direction and the Y-direction, and vibration node areas 173 appear as a checkerboard pattern (conventional vibrational mode). In the vibrational mode where m=0, n=1, the vibration has peaks, nodes and valleys parallel to a side (side LB) that extends parallel to the Y-direction. In the vibrational mode identified with a checkerboard pattern or peaks, nodes and valleys parallel to a side, the X-direction vibration and the Y-direction vibration remain independent, never synthesized to increase the vibrational amplitude.

Here, if the dust filter 119 is shaped a little close to a rectangle, a vibrational mode with a very large vibrational amplitude can be obtained, even if a piezoelectric element is placed along one side as in this embodiment. (The maximum amplitude at the same level as at the conventional circular dust filter is generated.) At this time, the vibrational mode will be the mode shown in FIG. 5A is obtained. In this vibrational mode, though the dust filter 119 is rectangular, the peak ridges 174 of vibrational amplitude form closed loops (substantially circular in FIG. 5A) around the center of the optical axis. Consequently, a reflected wave coming from a side extending in the X-direction and a reflected wave coming from a side extending in the Y-direction are efficiently combined, forming a standing wave. Here, the dust filter 119 has at least one side symmetric to the first virtual line VL1 passing through the centroid 119c, and the piezoelectric element 120 is disposed so that a centroid of the piezoelectric element 120 is located on the first virtual line VL1. The center of the closed loop formed by the peak ridges 174 of vibrational amplitude becomes a central vibrating area 175 having maximum vibration speed and vibrational amplitude. The centroid 175a of the central vibrating area 175 and the centroid 173a of an area surrounded by the node area 173 having almost no vertical vibrational amplitude against the surface formed in the bottom surface portion 119a of the dust filter 119, including the centroid 175a of the central vibrating area 175, are substantially identical and similarly located on the above first virtual line VL1. That is, the piezoelectric element 120 has one longitudinal side arranged to be almost parallel to one side of each of the plate-shaped image forming light passing area 149 and the bottom surface portion 119a. The first virtual line VIA is a line that connects the intermediate point of the one longitudinal side of the piezoelectric element 120 to the intermediate point (the centroid 119c of the dust filter 119) of the one side of each of the plate-shaped image forming light passing area 149 and the bottom surface portion 119a. The first virtual line VL1 matches a second virtual line VL2 to be described below. That is, the second virtual line VL2 is a line that connects the vibration center (the centroid 175a of the central vibrating area 175) of the plate-shaped image forming light passing area 149 and the bottom surface portion 119 to the intermediate point (the centroid 119c of the dust filter 119) of the one side of each of the plate-shaped image forming light passing area 149 and the bottom surface portion 119a.

However, since only one piezoelectric element 120 is disposed, the centroid 175a of the central vibrating area 175 is displaced from the centroid 119c of the dust filter 119 to a side provided with the piezoelectric element 120.

Here, the centroid of the piezoelectric element 120 does not expand or contract, even if a driving voltage is applied, and hence the piezoelectric element 120 is preferably attached so that the centroid thereof is positioned in the node area. On the other hand, since the side wall portion 119b1 of the dust filter 119 extends in a direction of the amplitude of the generated vibration, a boundary portion between the bottom surface portion 119a and the side wall portion 119b1 on the above first virtual line VL1 does not vibrate but forms the node area 173. Therefore, the piezoelectric element 120 has the centroid thereof disposed in the above boundary portion on the above first virtual line VL1. In this case, when the piezoelectric element 120 is disposed on the bottom surface portion 119a of the dust filter 119, the position of the centroid becomes a position where the vibrational amplitude becomes large to a certain degree, even if the element is disposed along a long side in the above boundary portion. This is because the piezoelectric element 120 has a certain degree of dimension in a short side direction thereof. On the other hand, when the piezoelectric element 120 is disposed on the side wall portion 119b1 of the dust filter 119, the position of the centroid preferably substantially corresponds to the above boundary portion, because the piezoelectric element 120 has a small dimension in a thickness direction.

Moreover, in a case where the open end of the dust filter 119 is an end of the bottom surface portion as shown in FIG. 7 and only one piezoelectric element 120 is disposed, even when the peak ridges 174 of the vibrational amplitude draws a concentric circle, a perfect circular shape cannot easily be obtained. This is because a symmetric shape is not easily obtained and reflecting conditions are not well set. On the other hand, in the box-like dust filter 119 shown in FIG. 5A to FIG. 5O, the perfect circular shape is drawn. This is because the boundary portions between the bottom surface portion 119a and the side wall portion 119h1 on the above first virtual line VL1 and a virtual axis which is orthogonal to this first virtual line VL1 form the node areas 173.

The dust filter 119 of the vibrator 170, shown in FIGS. 5A to 5S, is formed from a glass plate (optical element) having a size of 25.0 mm (X-direction: LA, LF)×24.2 mm (Y-direction: LB)×4.2 mm (Z-direction: H) and including the bottom surface portion 119a and sidewall portions 119b1 having a uniform thickness of 0.2 mm. The dust filter 119 is rectangular, having long sides LA (25.0 mm, extending in the X-direction) and short sides LB (24.2 mm). Therefore, the bottom surface portion 119a of the dust filter 119 is identical to the "virtual rectangle" according to this invention, which has the same area as a member surface of the bottom surface portion. The piezoelectric element 120 is made of a lead titanate-zirconate ceramic and has a size of 16.6 mm (X-direction)× 2.4 mm (Y-direction)×0.6 mm (thickness). The piezoelectric element 120 is adhered with epoxy-based adhesive to the dust filter 119, extending along the side wall portion 119b1. More specifically, the piezoelectric element 120 extends in the X-direction, and arranged symmetric in the Z-direction, with respect to an axis which is parallel to the X-axis passing through the center of the side wall portion of the dust filter 119 and an axis which is parallel to the Z-axis. At this time, the resonance frequency in the vibrational mode of FIG. 5A is in the vicinity of 44 kHz. At the center of the dust filter 119, the central vibrating area 175 having maximal vibration speed and vibrational amplitude can be attained if the dust filter is shaped like a circle in which the rectangular dust filter 119 is inscribed.

Figure 6:
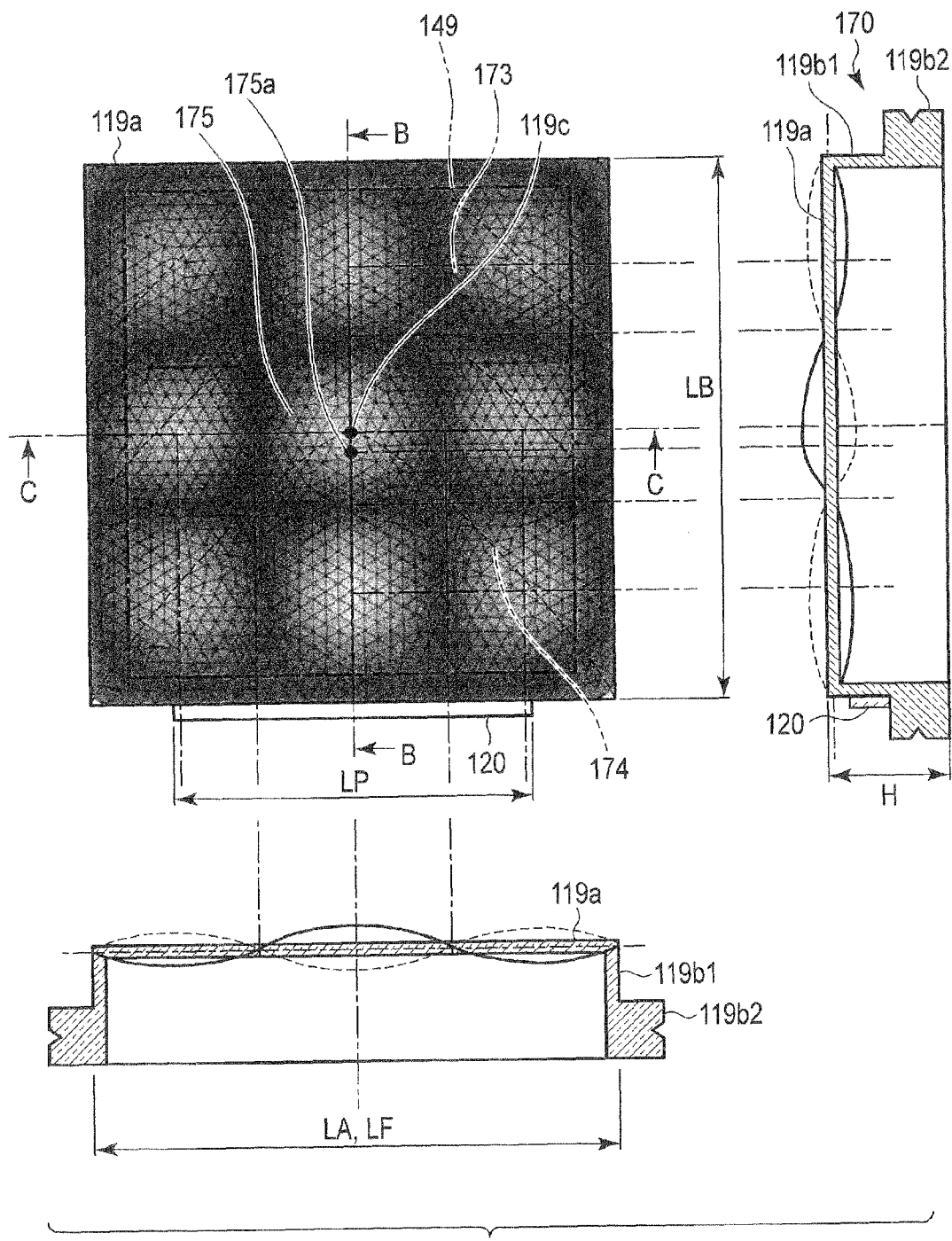
FIG. 6 is a diagram explaining how the dust filter is vibrated in another

Moreover, a vibrational mode of FIG. 6 is a mode generated by changing a vibrating frequency of the dust filter 119 shown in FIG. 5A to FIG. 5C. In this vibrational mode, the peak ridges 174 of the vibrational amplitude continuously positioned substantially in the form of concentric circles are formed from one side to the other side disposed to face the one side symmetrically to a certain first virtual line VL1 passing through the centroid 119c of the dust filter 119. Here, the center of each of the peak ridges 174 substantially having the continuously concentric circle shapes is located on the above first virtual line VL1 on a side opposite to the above other side via the above one side of the dust filter 119.

Figure 8:
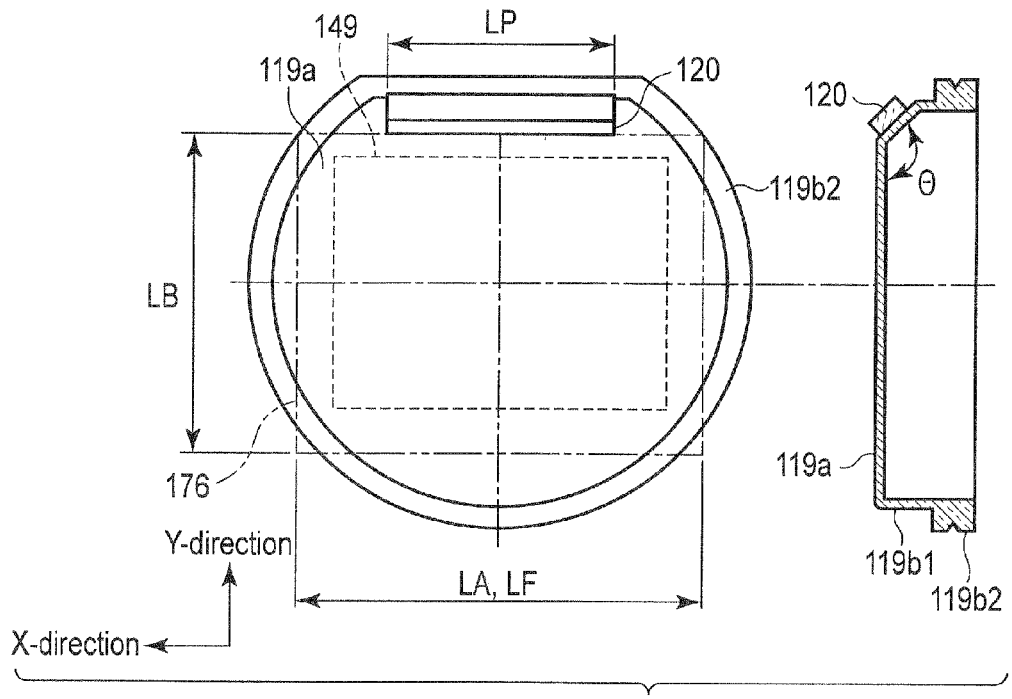
FIG. 8 is a diagram showing another configuration the dust filter may have.

FIG. 8 shows a modification of the vibrator 170. The modified vibrator uses a bottom surface portion 119a of a dust filter 119 having a shape formed by cutting a part of a plate shaped like a disc, thus defining one side. That is, the modified vibrator 170 uses a D-shaped bottom surface portion 119a of the dust filter 119 that has a side symmetric with respect to the symmetry axis extending in the Y-direction. The piezoelectric element 120 is arranged on the surface of the side wall portions 119b1 of the dust filter 119, extending parallel to that side and positioned symmetric with respect to the midpoint of the side (or to a symmetry axis extending in the Y-direction (the first virtual line VL1)). Here, the surface of the dust filter 119 on which the piezoelectric element 120 is disposed has an angle θ of about 135° between the surface and the bottom surface portion 119a. When the dust filter 119 is formed in such a shape, symmetry of the shape of the dust filter 119 with respect to the center (the centroid 119c of the dust filter 119) of the dust filter becomes high, and a vibration state of the present embodiment (a vibrational mode in which a vibration peak is generated in the form of a concentric circle) is more easily formed. In addition, the shape of the dust filter 119 becomes smaller than a circular one. Furthermore, since the piezoelectric element 120 is disposed on the side wall portion 119b1, the bottom surface portion 119a of the dust filter 119 is further miniaturized. Moreover, a rigidity of the side wall portion 119b1 of the dust filter 119 becomes high. It is to be noted that in FIG. 8, the angle between the only one surface of the side wall portion 119b1 on which the piezoelectric element 120 is disposed and the bottom surface portion 119a is not the right angle, but an angle between each of the another side wall portion 119b1 and the bottom surface portion 119a of the dust filter is a right angle. The angle between the each of another side wall portion 119b1 except the above one surface and the bet torn surface portion 119a may be set to an angle of about 90° to 135°. When the angle is set to be larger than 90°, the shape of the dust filter gradually comes close to a disc shape, and hence the vibrational mode having a concentric peak is easily generated, whereby strong vibration having a higher vibration speed is easily generated. Furthermore, when the dust filter 119 is formed in a box-like shape, the rigidity thereof is raised. If the dust filter having a plate shape is not accurately supported, the dust filter might break down during the vibration. Therefore, a plate thickness, which has been set to be about 0.5 mm in the plate shape dust filter, can be set to 0.3 mm or less in the box-like shape dust filter. Consequently, since the thickness of the bottom surface portion 119a to be vibrated can be set to be small, the vibration speed can be set to be higher than that generated in the plate shape dust filter. On the other hand, the side wall portion 119b constituting the dust filter 119 has a high rigidity in a vibrating direction of the bottom surface portion 119a, and almost does not vibrate in the vibrating direction of the bottom surface portion 119a.

Figure 9:
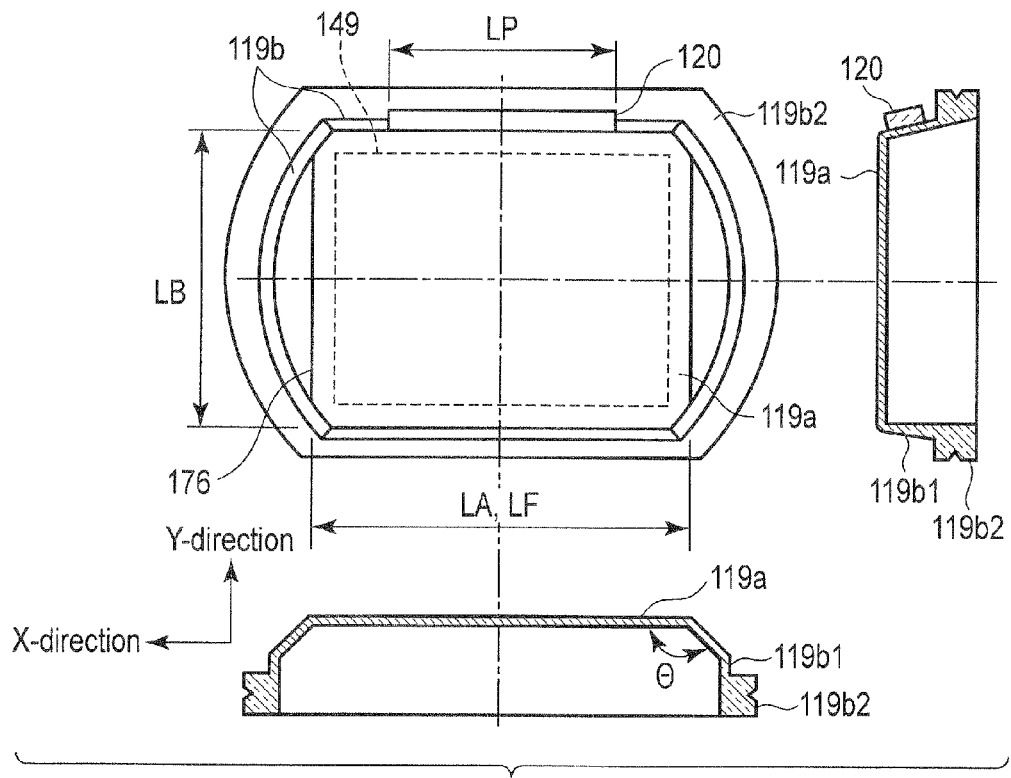
FIG. 9 is a diagram showing still another configuration the dust filter may have.

FIG. 9 shows another modification of the vibrator 170. This modified vibrator uses a bottom surface portion 119a of a dust filter 119 having an oval shape formed by symmetrically cutting a circular plate along two parallel lines, forming two parallel sides. That is, the modified vibrator 170 uses a dust filter 119 that has two sides symmetric with respect to the symmetry axis extending in the Y-direction. Moreover, the surface of the filter including two circles is provided with a slope having an angle of about 135° between the slope and the bottom surface portion 119a, and the filter is formed to be smaller than the dust filter 119 of FIG. 8. Furthermore, a thickness of the side wall portions 119b1 to be provided with an open end 119d smoothly increases from the bottom surface portion 119a, excluding the side wall portion 119b on which a piezoelectric element 120 is disposed. Since the thickness of the filter on the side of the open end is large, the fixing of the dust filter 119 is stabilized as compared with the dust filter 119 of FIG. 8. In this case, the piezoelectric element 120 is disposed on the upper side wall portion 119b1 of two side wall portions 119b1 continuously arranged along the above two sides. Here, the thickness of the side wall portion 119b1 provided with the piezoelectric element 120 is as small as that of the bottom surface portion 119a, and hence vibration generated in the piezoelectric element 120 is efficiently transmitted to the bottom surface portion 119a, whereby strong vibration having a high vibration speed can be generated in the bottom surface portion 119a. It is to be rioted that here, short and long sides of a virtual rectangle 176 in FIG. 9 substantially correspond to short and long sides of the bottom surface portion 119a as shown in the drawing.

Note that it has been described that a material of the dust filter 119 is transparent glass, but the material may be a resin such as a methacrylic methyl resin or a polycarbonate resin. A resin or glass material which enables forming is optimum.

Figure 10:
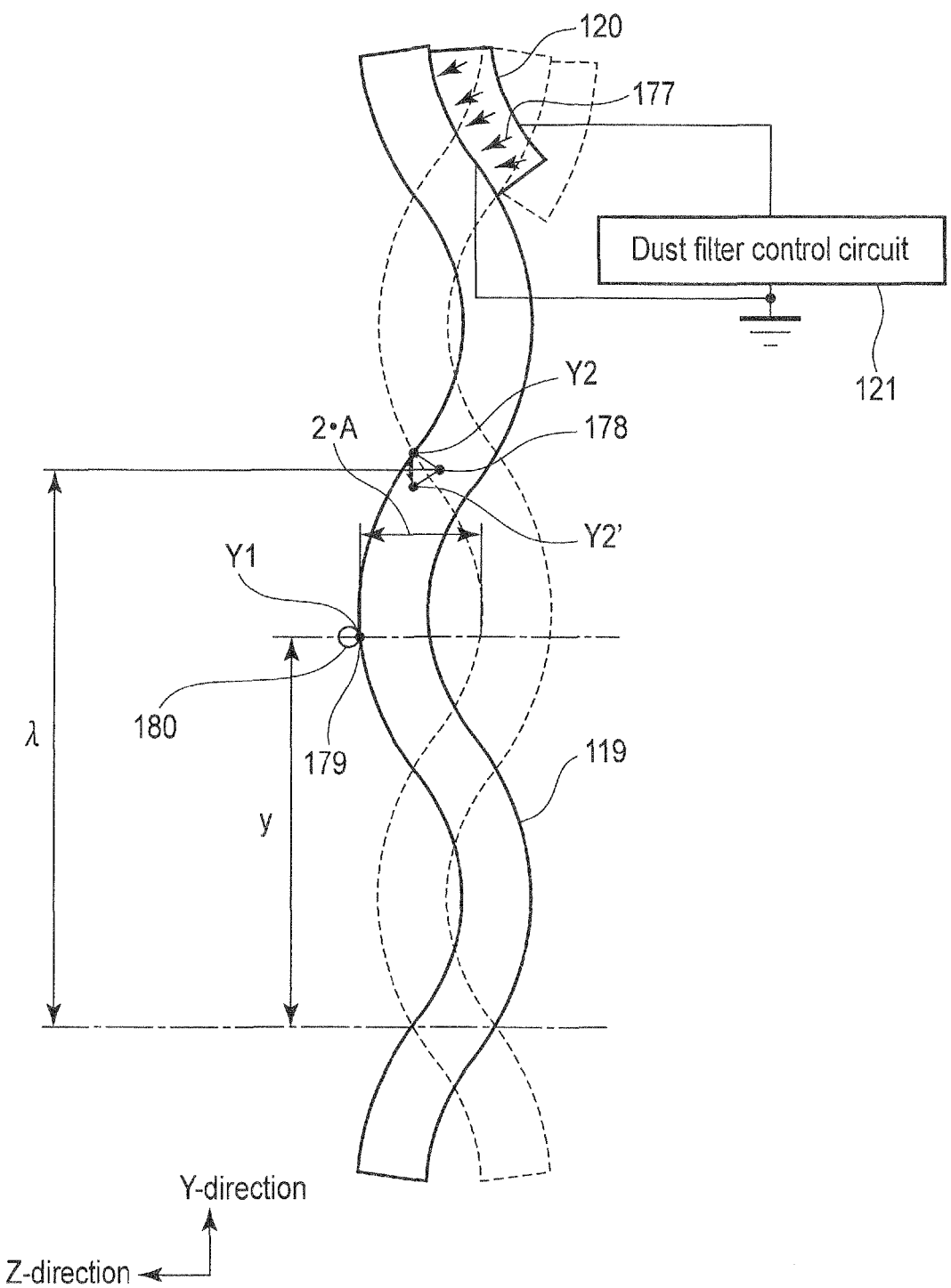
FIG. 10 is a conceptual diagram of the dust filter, explaining the standing wave that is produced in the dust filter.

A method of removing dust will be explained in detail, with reference to FIG. 10. FIG. 10 shows a cross section identical to that shown in a sectional view taken along a line B-B in FIG. 7. Assume that the piezoelectric element 120 is polarized in the direction of arrow 177 as shown in FIG. 10. If a voltage of a specific frequency is applied to the piezoelectric element 120 at a certain time $t_0$, the vibrator 170 will be deformed as indicated by solid lines. At the mass point. Y existing at given position y in the surface of the vibrator 170, the vibration z in the Z-direction is expressed by Equation 2, as follows:

$$z = A \cdot \sin(Y) \cdot \cos(\omega t) \quad (2)$$

where $\omega$ is the angular velocity of vibration, A is the amplitude of vibration in the Z-direction, and $Y = \pi y / \lambda$ ($\lambda$: wavelength of bending vibration).

The Equation 2 represents the standing-wave vibration shown in FIG. 7. Thus, if $y = s \cdot \lambda / 2$ (here, s is an integer), then $Y = s\pi$, and $\sin(Y) = 0$. Hence, a node 178, at which the amplitude of vibration in the Z-direction is zero irrespective of time, exists for every $\pi/2$. This is standing-wave vibration. The state indicated by broken lines in FIG. 10 takes place if $t = k\pi/\omega$ (k is odd), where the vibration assumes a phase opposite to the phase at time $t_0$.

Vibration $z(Y_1)$ at point $Y_1$ on the dust filter 119 is located at an antinode 179 of standing wave, bending vibration. Hence, the vibration in the Z-direction has amplitude A, as expressed in Equation 3, as follows:

$$z(Y_1) = A \cdot \cos(\omega t) \quad (3)$$

If Equation 3 is differentiated with time, the vibration speed $Vz(Y_1)$ at point $Y_1$ is expressed by Equation 4, below, because $\omega = 2\pi f$, where f is the frequency of vibration:

$$Vz(Y_1) = \frac{d(z(Y_1))}{dt} = -2\pi f \cdot A \cdot \sin(\omega t) \quad (4)$$

If Equation 4 is differentiated with time, vibration acceleration $\alpha z(Y_1)$ is expressed by Equation 5, as follows:

$$\alpha z(Y_1) = \frac{d(Vz(Y_1))}{dt} = -4\pi^2 f^2 \cdot A \cdot \cos(\omega t) \quad (5)$$

Therefore, the dust 180 adhering at point $Y_1$ receives the acceleration of Equation 5. The inertial force Fk the dust 180 receives at this time is given by Equation 6, as follows:

$$Fk = \alpha z(Y_1) \cdot M = -4\pi^2 f^2 A \cdot \cos(\omega t) \cdot M \quad (6)$$

where M is the mass of the dust 180.

As can be seen from Equation 6, the inertial force Fk increases as frequency f is raised, in proportion to the square of f. However, the inertial force cannot be increased if amplitude A is small, no matter how much frequency f is raised. Generally, kinetic energy of vibration can be produced, but in a limited value, if the piezoelectric element 120 that produces the kinetic energy has the same size. Therefore, if the frequency is raise in the same vibrational mode, vibrational amplitude A will change in inverse proportion to the square of frequency f. Even if the resonance frequency is raised to achieve a higher-order resonance mode, the vibrational frequency will fall, not increasing the vibration speed or the vibration acceleration. Rather, if the frequency is raised, ideal resonance will hardly be accomplished, and the loss of vibrational energy will increase, inevitably decreasing the vibration acceleration. That is, the mode cannot attain large amplitude if the vibration is produced in a resonance mode that uses high frequency only. The dust removal efficiency will be much impaired.

Although the dust filter 119 is rectangular, the peak ridges 174 of vibrational amplitude form closed loops around the optical axis in the vibrational mode of the embodiment, which is shown in FIG. 5A. In the vibrational mode of the embodiment, which is shown in FIG. 6, the peak ridges 174 of vibrational amplitude form curves surrounding the midpoint of each side. The wave reflected from the side extending in the X-direction and the wave reflected from the side extending in the Y-direction are efficiently synthesized, forming a standing wave. On the other hand, in the vibrational mode of FIG. 5A, the maximum vibration speed around the center of the area which spreads from the center of the dust filter 119 and through which the object light passes is largest. In the vibrational mode of FIG. 6, the maximum vibration speed of the above center lowers from about 50% to 70% of that in the vibrational mode of FIG. 5A. Even in the vibrational mode of FIG. 6, however, the maximum vibration speed of the center is larger than that in the conventional rectangular flat plate.

In vibration wherein the peak ridges 174 of vibrational amplitude form closed loops around the optical axis or the peak ridges 174 form curves surrounding the midpoint of each side, the dust filter 119 can undergo vibration of amplitude a similar to that of concentric vibration that may occur if the dust filter 119 has a disc shape. In any vibrational mode in which the amplitude is simply parallel to the side, the vibration acceleration is only 10% or more of the acceleration achieved in this embodiment.

In the vibration wherein the peak ridges 174 of vibrational amplitude form closed loops or curves surrounding the midpoint of each side, the vibrational amplitude is the largest at the center of the vibrator 170 and small at the closed loop or the curve at circumferential edges. Thus, the dust removal capability is maximal at the center of the image. If the center of the vibrator 170 is aligned with the optical axis, the shadow of dust 180 will not appear in the center part of the image, which has high image quality. This is an advantage.

In the vibration node areas 173, which exist in the focusing-beam passing area 149, the nodes 178 may be changed in position by changing the drive frequencies of the piezoelectric element 120. Then, the element 120 resonates in a different vibrational mode, whereby the dust can be removed, of course.

The prescribed frequency at which to vibrate the piezoelectric element 120 is determined by the shape and dimensions of the dust filter 119 and piezoelectric element 120 forming the oscillator 170, and the materials and supported states of them. Therefore, it is desirable to measure the temperature of the vibrator 170 and to consider the change in the natural frequency of the vibrator 170, before the vibrator 170 is used. A temperature sensor (not shown) is therefore connected to a temperature measuring circuit (not shown), in the digital camera 10. The value by which to correct the vibrational frequency of the vibrator 170 in accordance with the temperature detected by the temperature sensor is stored in the nonvolatile memory 128. Then, the measured temperature and the correction value are read into the Bucom 101. The Bucom 101 calculates a drive frequency, which is used as drive frequency of the dust filter control circuit 121. Thus, vibration can be produced, which is efficient with respect to temperature changes, as well.

Second Embodiment

This embodiment is the same as the first embodiment except the attachment structure of a dust filter 119. Hence, only the attachment structure of the dust filter 119 will be explained, and a description of other portions will be omitted.

Figure 11A:
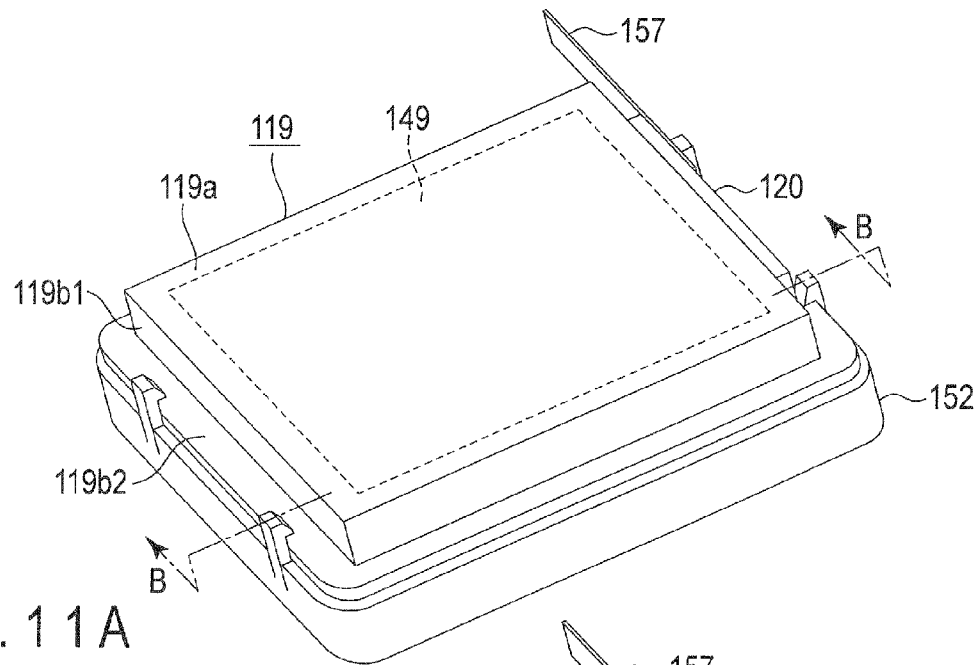
FIG. 11A is a perspective view of the dust removal mechanism of a digital camera according to a second embodiment.
Figure 11B:
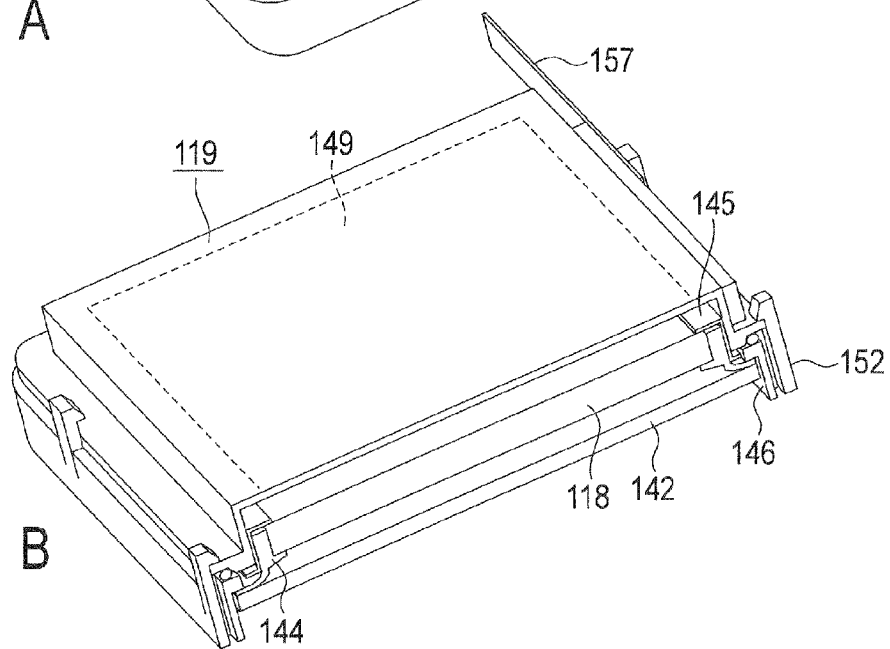
FIG. 11B is a sectional view taken along a line B-B in FIG. 11A.
Figure 11C:
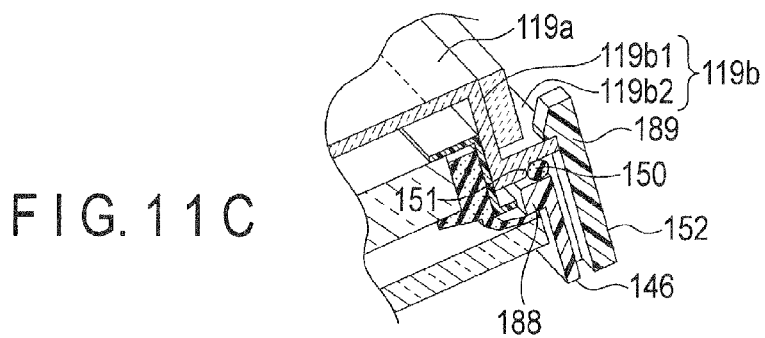
FIG. 11C is an enlarged view showing the main part of the sectional view of FIG. 11B.

In this embodiment, in place of the projecting portion 148 of the first embodiment, the edge of a holder 146 on the lens side in an opening 147 is formed for the entire circumference as a projecting portion 188 that projects to the side of the opening 147, thereby forming an L-shaped section, as shown in FIGS. 11A, 11B, and 11C. The circumferential edge of a filter holding member 144 is sandwiched between the projecting portion 188 and a protection glass plate 142 provided in a CCD 117, thereby maintaining the substantial airtightness between the CCD 117 and an optical LPF 118. A groove portion 151 is formed for the entire circumference in the external edge portion of the projecting portion 188 of the holder 146, in which a frame-shaped sealing member 150 fitted on foot portions 119*b* of the dust filter 119 is fitted so as to be held and fixed.

A holding member 152 includes a plurality of lock portions 189. The dust filter 119 is held and fixed by engaging the lock portions 189 with projecting portions 119*b*2 of the dust filter 119 and thus supporting the foot portions 119*b* of the dust filter 119.

As described above, in this embodiment, the support member that supports the foot portions 119*b* provided on the dust filter 119 includes the holding member 152 serving as a first support member that engages with the projecting portions 119*b*2, and the holder 146 serving as a second support member that forms the groove portion 151 together with the projecting portions 119*b*2 to arrange the frame-shaped sealing member 150.

Figure 12A:
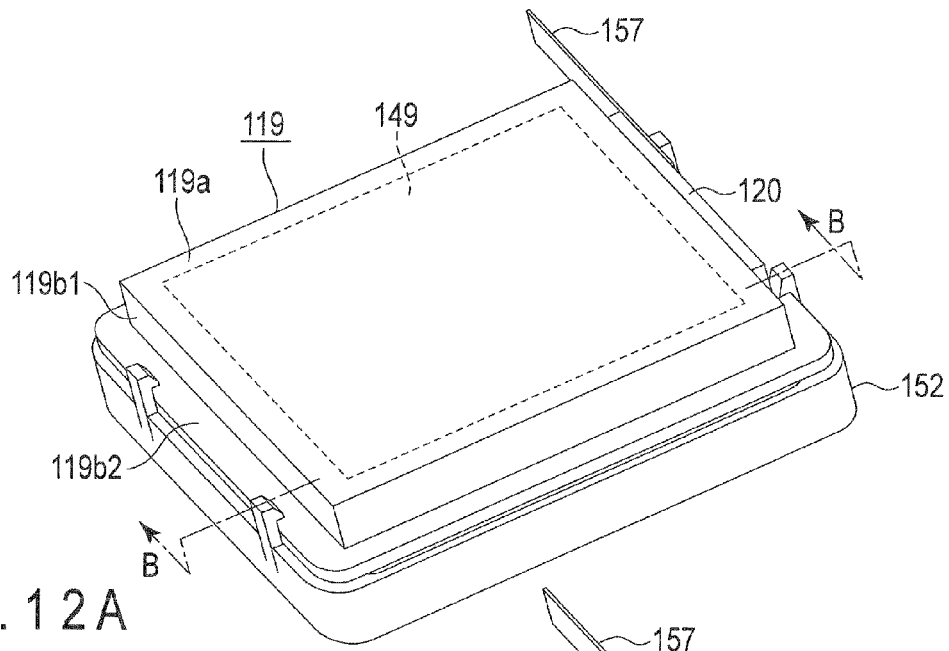
FIG. 12A is a perspective view of a modification of the dust removal mechanism of a digital camera according to the second embodiment.
Figure 12B:
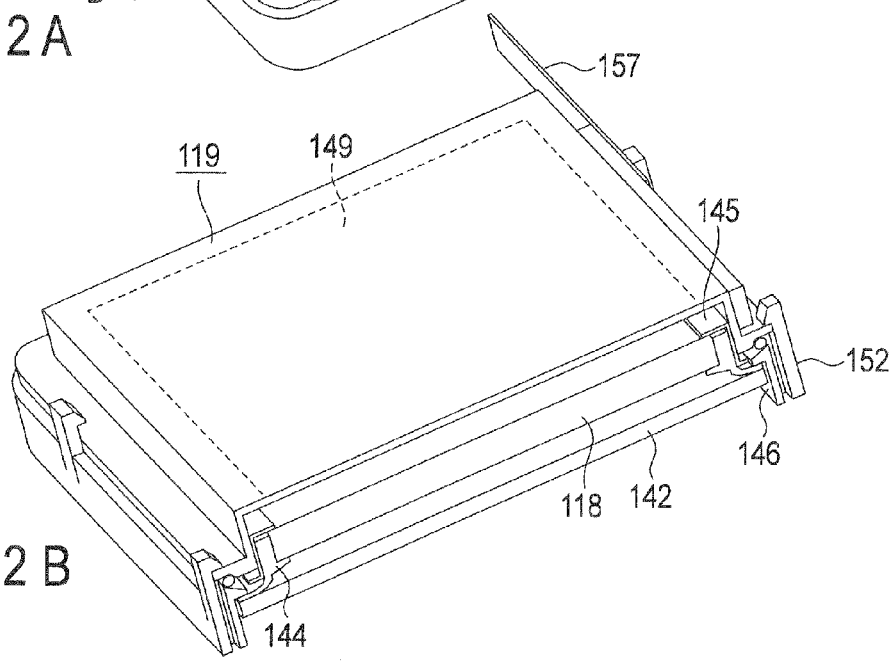
FIG. 12B is a sectional view taken along a line B-B in FIG. 12A.
Figure 12C:
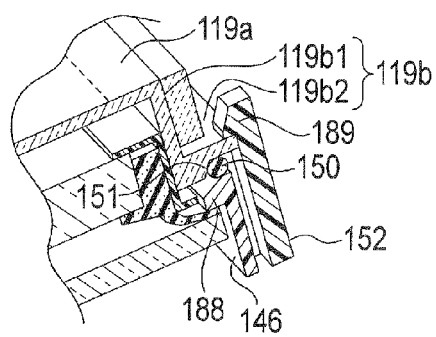
FIG. 12C is an enlarged view showing the main part of the sectional view of FIG. 12B.

FIGS. 12A, 12B, and 12C are views showing a modification of the dust removal mechanism of the digital camera according to the second embodiment of the present invention. In this modification, the shape of the projecting portion 188 of the holder 146 is changed. The lens-side surface of the projecting portion 188 tilts from the side of the groove portion 151, instead of being parallel to the projecting portions 119*b*2 extending from sidewall portions 119*b*1 to be parallel to an image forming light passing area 149 and a bottom surface portion 119*a*. This increases the biasing force the top portion of the projecting portion 188 applies to the groove portion 151. It is therefore possible to more firmly hold and fix the frame-shaped sealing member 150 fitted in the groove portion 151 and increase the airtightness.

The present invention has been explained, describing some embodiments. Nonetheless, this invention is not limited to the embodiments described above. Various changes and modifications can, of course, be made within the scope and spirit of the invention.

For example, in the above embodiments, a liquid crystal monitor is used a viewfinder. It is of course also possible to use a single-lens reflex camera having an optical viewfinder.

In the embodiments described above, the CCD 117 is used as an image sensor element. It is of course permitted to use a CMOS and other image sensor. Further, in the embodiments, the vibrating member is piezoelectric element 120. The piezoelectric element may be replaced by electrostrictive member or super magnetostrictive element. Furthermore, a plurality of vibrating members may be provided in peripheral portions of the dust-screening member, so that the oscillation amplitude can be greater. The transparent part of the dust-screening member may not necessarily be flat, but may be curved, for example, spherical.

In order to remove dust 180 more efficiently from the member vibrated, the member may be coated with an indium-tin oxide (ITO) film, which is a transparent conductive film, indium-zinc film, poly 3,4-ethylenedioxy thiophene film, surfactant agent film that is a hygroscopic anti-electrostatic film, siloxane-based film, or the like. In this case, the frequency, the drive time, etc., all related to the vibration, are set to values that accord with the material of the film.

Moreover, the optical LPF 118, described as one embodiment of the invention, may be replaced by a plurality of optical LPFs that exhibit birefringence. Of these optical LPFs, the optical LPF located closest to the object of photography may be used as a dust-screening member (i.e., a subject to be vibrated), in place of the dust filter 119 shown in FIG. 2.

Figure 2:
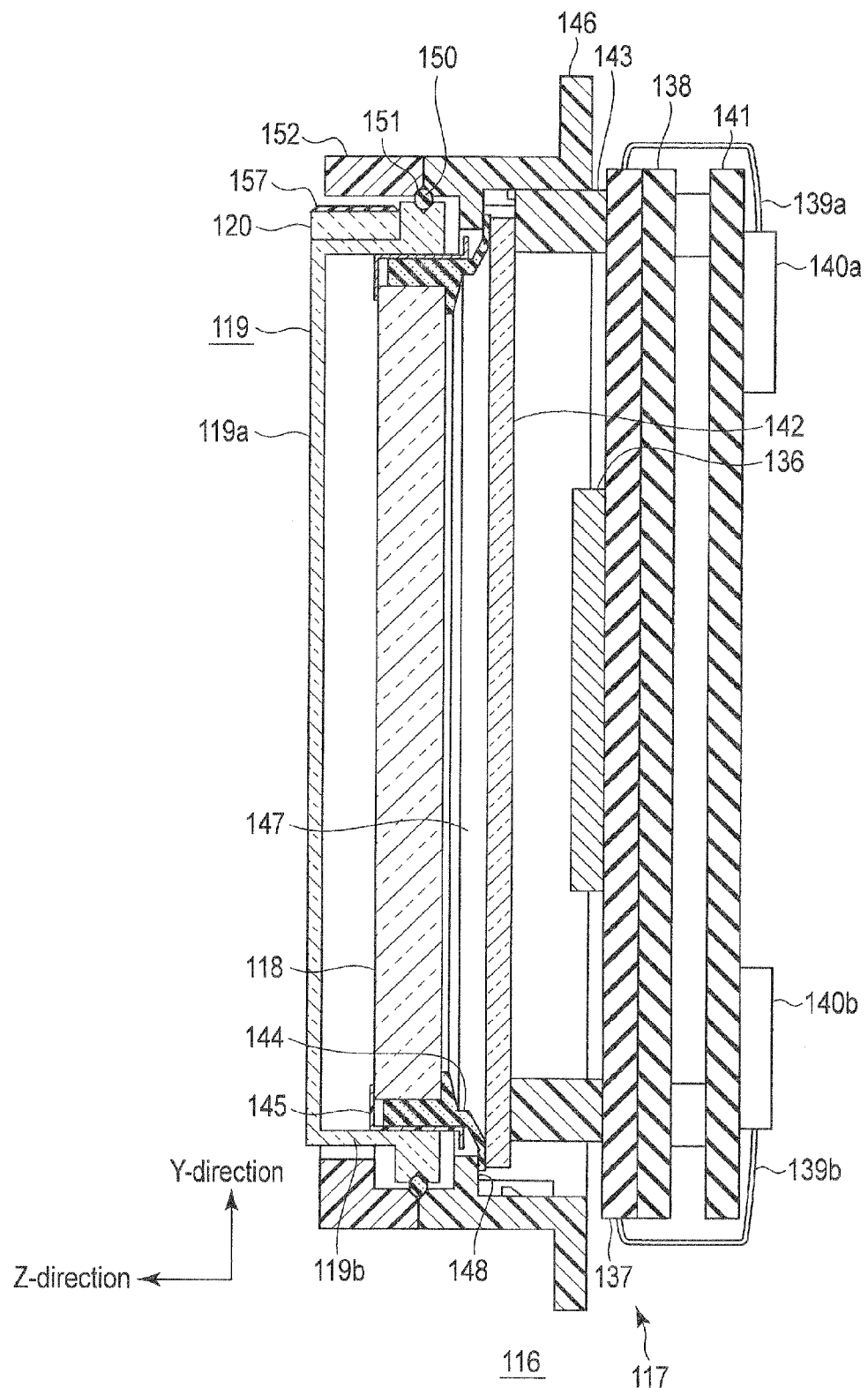
FIG. 2 is a vertical side view of an image acquisition unit of the digital camera, which includes a dust removal mechanism.
Figure 3A:
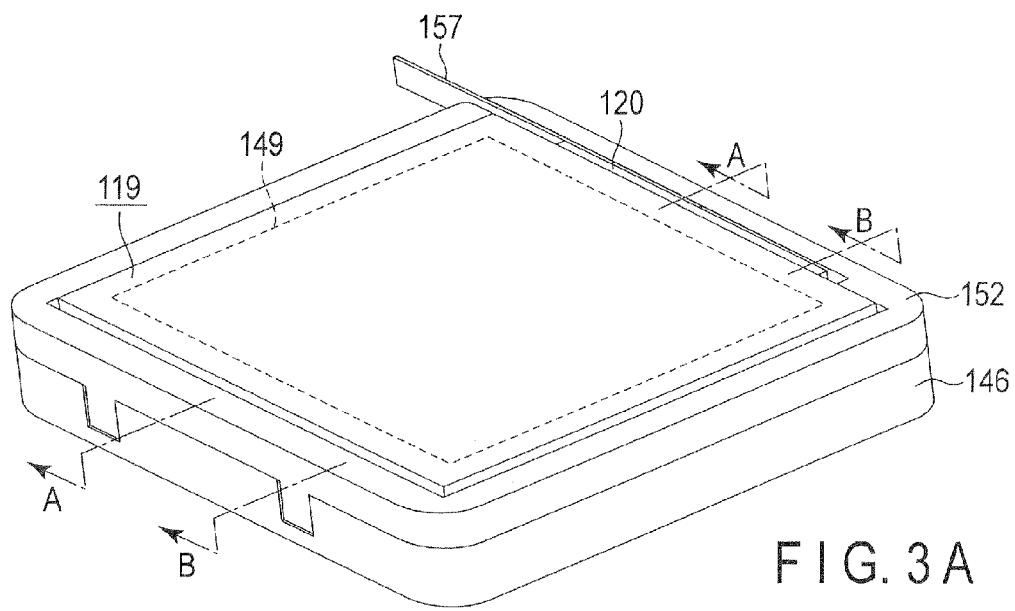
FIG. 3A is a perspective view of the dust removal mechanism of a digital camera according to the first embodiment.
Figure 3B:
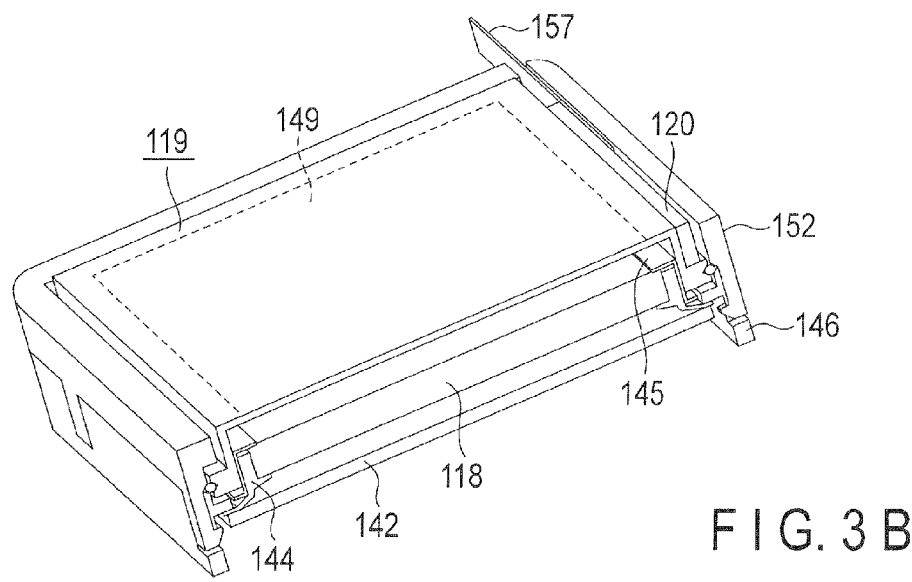
FIG. 3B is a sectional view taken along a line B-B in FIG. 3A.
Figure 3C:
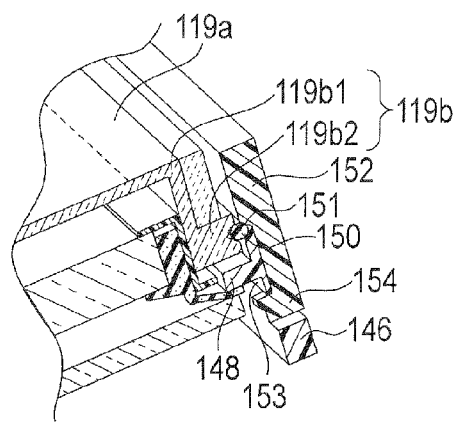
FIG. 3C is an enlarged view showing the main part of the sectional view of FIG. 3B.

Further, a camera may does not have the optical LPF 118 of FIG. 2 described as one embodiment of the invention, and the dust filter 119 may be used as an optical element such as an optical LPF, an infrared-beam filter, a deflection filter, or a half mirror.

Furthermore, the camera may not have the optical LPF 118, and the dust filter 119 may be replaced by the protection glass plate 142 shown in FIG. 2. In this case, the protection glass plate 142 and the CCD chip 136 remain free of dust and moisture, and the structure of FIG. 2 that supports and yet vibrates the dust filter 119 may be used to support and vibrate the protection glass plate 142. Needless to say, the protection glass plate 142 may be used as an optical element such as an optical LPF, an infrared-beam filter, a deflection filter, or a half mirror.

The image equipment according to this invention is not limited to the image acquisition apparatus (digital camera) exemplified above. This invention can be applied to any other apparatus that needs a dust removal function. The invention can be practiced in the form of various modifications, if necessary. More specifically, a dust moving mechanism according to this invention may be arranged between the display element and the light source or image projecting lens in an image projector.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A vibrating device comprising:
    a dust-screening member arranged in front of an image forming unit that holds an image forming element configured to generate an optical image, the dust-screening member being formed into a box shape that includes a plate-shaped polygonal light transmitting part that passes one of light entering from the image forming element and light entering to the image forming element, and a plurality of foot portions that tilt by a predetermined angle and extend from one of all sides of the light transmitting part and portions near all sides in a direction in which the image forming unit is located;
    a support member configured to support the plurality of foot portions;
    a vibrating member fixed to at least one of the plurality of foot portions and configured to apply a vibrational amplitude vertical to a surface of the light transmitting part to be vibrated;
    an elastic member arranged to seal a space between the support member and the plurality of foot portions,
    wherein the light transmitting part and the plurality of foot portions are formed using the same material, and
    the dust-screening member is held by an elastic force of the elastic member arranged between the support member and the plurality of foot portions.

2. The device according to claim 1, wherein
    each of the plurality of foot portions includes:
        a sidewall portion configured to be able to arrange the vibrating member thereon; and
        a projecting portion formed at one end of the sidewall portion not to be in contact with the vibrating member, and
    the elastic member is arranged at a position to seal a space between the projecting portion and the support member.

3. The device according to claim 2, wherein
    the projecting portion engages with the support member, and
    the elastic member is arranged at a position to generate a biasing force to maintain an engaging state between the projecting portion and the support member and to seal the space between the projecting portion and the support member.

4. The device according to claim 2, wherein a section of the sidewall portion and the projecting portion has a substantial L shape.

5. The device according to claim 2, wherein the elastic member is arranged in a groove portion formed by the projecting portion and the support member.

6. The device according to claim 2, wherein the support member includes:
    a first support member configured to engage with the projecting portion; and
    a second support member configured to form an groove portion together with the projecting portion to arrange the elastic member.

7. The device according to claim 2, wherein
    the light transmitting part is rectangular,
    the sidewall portion substantially vertically extends from the light transmitting part, and
    the projecting portion extends from the sidewall portion to be substantially parallel to the light transmitting part.

8. The device according to claim 1, wherein
    the vibrating member is rectangular, and
    the vibrating member is arranged to be stored inside the sidewall portions.

9. The device according to claim 1, wherein
    one longitudinal side of the vibrating member is arranged to be substantially parallel to one side of the plate-shaped light transmitting part, and
    a first virtual line that connects an intermediate point of the one longitudinal side of the vibrating member to an intermediate point of the one side of the plate-shaped light transmitting part matches a second virtual line that connects a vibration center of the plate-shaped light transmitting part to the intermediate point of the one side of the plate-shaped light transmitting part.

10. An image equipment comprising:
    an image forming unit configured to hold an image forming element configured to generate an optical image;
    a dust-screening member arranged in front, of the image forming unit, the dust-screening member being formed into a box shape that includes a plate-shaped polygonal light transmitting part that passes one of light entering from the image forming element and light entering to the image forming element, and a plurality of foot portions that tilt by a predetermined angle and extend from one of all sides of the light transmitting part and portions near all sides in a direction in which the image forming unit is located;
    a support member configured to support the plurality of foot portions;
    a vibrating member fixed to at least one of the plurality of foot portions and configured to apply a vibrational amplitude vertical to a surface of the light transmitting part to be vibrated;
    an elastic member arranged to seal a space between the support member and the plurality of foot portions,
    wherein the light transmitting part and the plurality of foot portions are formed using the same material, and
    the dust-screening member is held by an elastic force of the elastic member arranged between the support member and the plurality of foot portions.

11. The equipment according to claim 10, wherein
    each of the plurality of foot portions includes:
        a sidewall portion configured to be able to arrange the vibrating member thereon; and
        a projecting portion formed at one end of the sidewall portion not to be in contact with the vibrating member, and
    the elastic member is arranged at a position to seal a space between the projecting portion and the support member.

12. The equipment according to claim 11, wherein
the projecting portion engages with the support member, and
the elastic member is arranged at a position to generate a biasing force to maintain an engaging state between the projecting portion and the support member and to seal the space between the projecting portion and the support member.

13. The equipment according to claim 11, wherein a section of the sidewall portion and the projecting portion has a substantial L shape.

14. The equipment according to claim 11, wherein the elastic member is arranged in a groove portion formed by the projecting portion and the support member.

15. The equipment according to claim 11, wherein the support member includes:
a first support member configured to engage with the projecting portion; and
a second support member configured to form an groove portion together with the projecting portion to arrange the elastic member.

16. The device according to claim 11, wherein
the light transmitting part is rectangular,
the sidewall portion substantially vertically extends from the light transmitting part, and
the projecting portion extends from the sidewall portion to be substantially parallel to the light transmitting part.

17. The device according to claim 10, wherein
the vibrating member is rectangular, and
the vibrating member is arranged to be stored inside the sidewall portions.

18. The device according to claim 10, wherein
one longitudinal side of the vibrating member is arranged to be substantially parallel to one side of the plate-shaped light transmitting part, and
a first virtual line that connects an intermediate point of the one longitudinal side of the vibrating member to an intermediate point of the one side of the plate-shaped light transmitting part matches a second virtual line that connects a vibration center of the plate-shaped light transmitting part to the intermediate point of the one side of the plate-shaped light transmitting part.

* * * * *